US011363416B2

(12) United States Patent
Chen et al.

(10) Patent No.: US 11,363,416 B2
(45) Date of Patent: Jun. 14, 2022

(54) SYSTEM AND METHOD FOR WIFI-BASED INDOOR LOCALIZATION VIA UNSUPERVISED DOMAIN ADAPTATION

(71) Applicant: SAMSUNG ELECTRONICS CO., LTD., Suwon-si (KR)

(72) Inventors: Xi Chen, Brossard (CA); Hang Li, Montreal (CA); Chenyi Zhou, Montreal (CA); Xue Liu, Montreal (CA); Di Wu, Montreal (CA); Gregory L. Dudek, Montreal (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 16/913,493

(22) Filed: Jun. 26, 2020

(65) Prior Publication Data
US 2021/0105578 A1 Apr. 8, 2021

Related U.S. Application Data

(60) Provisional application No. 62/910,835, filed on Oct. 4, 2019.

(51) Int. Cl.
*H04W 4/029* (2018.01)
*H04R 1/32* (2006.01)
(Continued)

(52) U.S. Cl.
CPC .............. *H04W 4/029* (2018.02); *G06N 3/04* (2013.01); *G06N 3/08* (2013.01); *G06Q 30/0261* (2013.01);
(Continued)

(58) Field of Classification Search
CPC ........ H04W 4/029; H04W 84/12; G06N 3/04; G06N 3/08; G06N 3/0454; G06N 3/088;
(Continued)

(56) References Cited

U.S. PATENT DOCUMENTS 8,577,354 B2 11/2013 Mathews
9,049,225 B2 6/2015 Jana et al.
(Continued)

FOREIGN PATENT DOCUMENTS

CN 106127170 A 11/2016
CN 109040957 A 12/2018
(Continued)

OTHER PUBLICATIONS

International Search Report (PCT/ISA/210) and Written Opinion (PCT/ISA/237) dated Dec. 4, 2020 by the International Searching Authority in counterpart International Patent Application No. PCT/KR2020/011757.

*Primary Examiner* — Marcos L Torres
(74) *Attorney, Agent, or Firm* — Sughrue Mion, PLLC

(57) ABSTRACT

A location-aware electronic device is provided. The electronic device trains feature extraction layers, reconstruction layers, and classification layers. The training may be based on a reconstruction loss and/or a clustering loss. The electronic device processes a fingerprint to obtain an augmented fingerprint using randomization based on statistics of the fingerprint. The feature extraction layers provide feature data to both the reconstruction layers and the classification layers. The classification layers operate on the codes to obtain an estimated location label. An application processor operates on the estimated location label to provide a location-aware application result to a person.

16 Claims, 24 Drawing Sheets

(51) Int. Cl.
  *G06Q 30/02* (2012.01)
  *G06N 3/04* (2006.01)
  *G06N 3/08* (2006.01)
  *H04R 3/12* (2006.01)
  *G06F 1/3231* (2019.01)
  *H04W 84/12* (2009.01)
(52) U.S. Cl.
  CPC ........... *G06Q 30/0267* (2013.01); *H04R 1/32* (2013.01); *H04R 3/12* (2013.01); *G06F 1/3231* (2013.01); *H04W 84/12* (2013.01)
(58) Field of Classification Search
  CPC .. G06Q 30/0261; G06Q 30/0267; H04R 1/32; H04R 3/12; H04R 2430/20; G06F 1/3231; G06F 21/31; G06K 9/0057; G06K 9/6259; G06V 10/82; G06V 40/23
  See application file for complete search history.

(56) References Cited

U.S. PATENT DOCUMENTS

| | | | |
|---|---|---|---|
| 9,445,387 | B2 | 9/2016 | Han |
| 10,070,264 | B2 | 9/2018 | Han et al. |
| 10,251,058 | B2 * | 4/2019 | Wen ................ H04L 9/3226 |
| 2014/0066043 | A1 | 3/2014 | Mathews |
| 2015/0018003 | A1 | 1/2015 | Zhou et al. |
| 2016/0127931 | A1 * | 5/2016 | Baxley ............... G06F 16/285 |
| | | | 455/67.16 |
| 2020/0117863 | A1 * | 4/2020 | Ha ..................... G06K 19/0723 |

FOREIGN PATENT DOCUMENTS

| | | |
|---|---|---|
| JP | 2017-527790 A | 9/2017 |
| KR | 10-2014-0054788 A | 5/2014 |
| KR | 10-2019-0030059 A | 3/2019 |

* cited by examiner

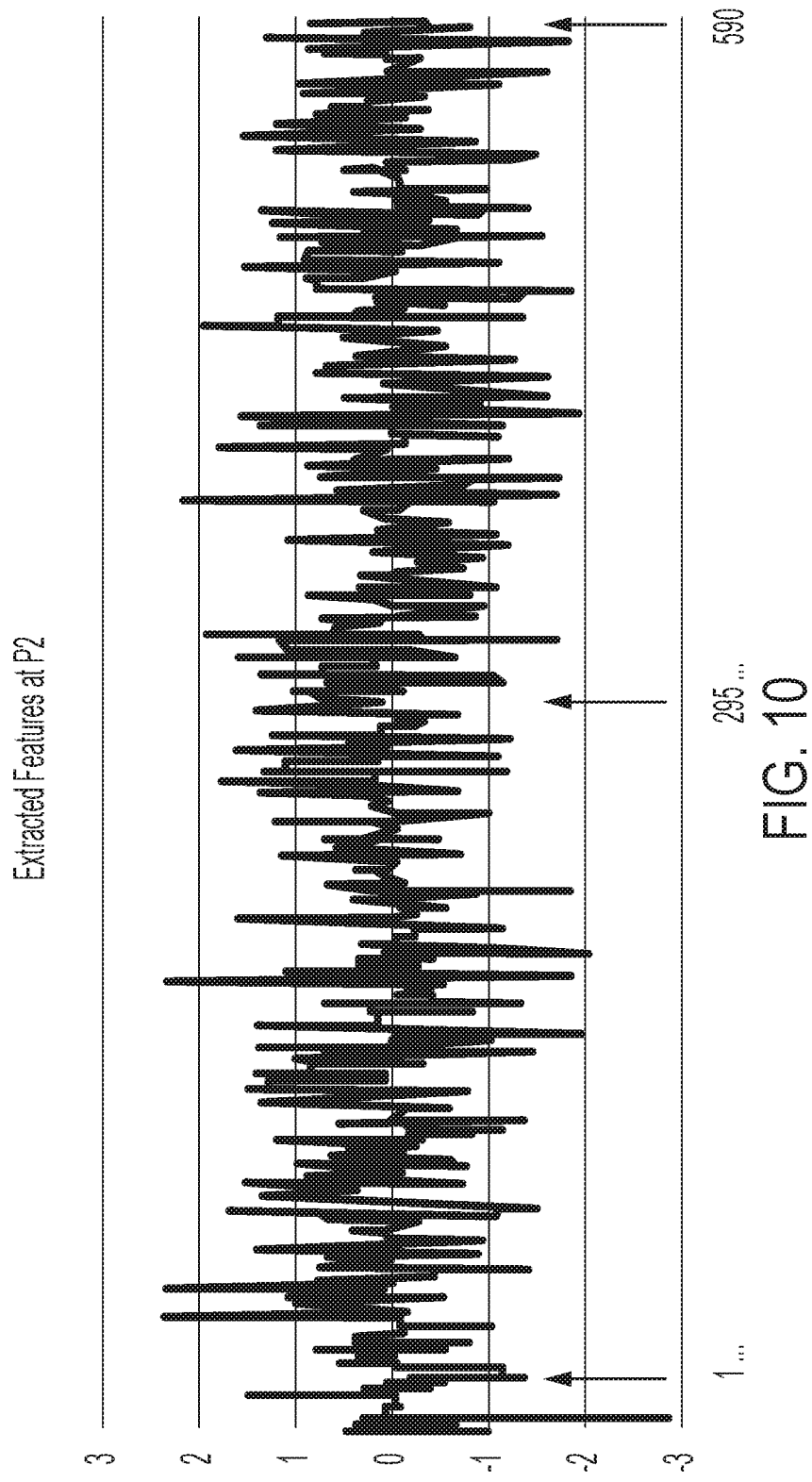

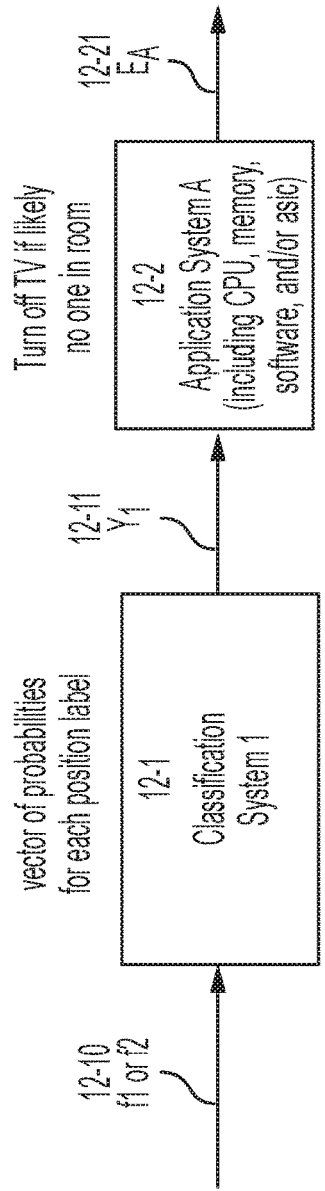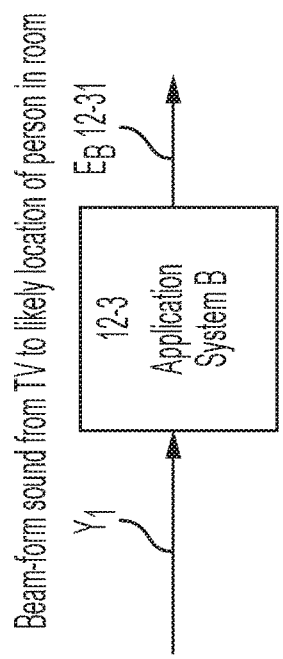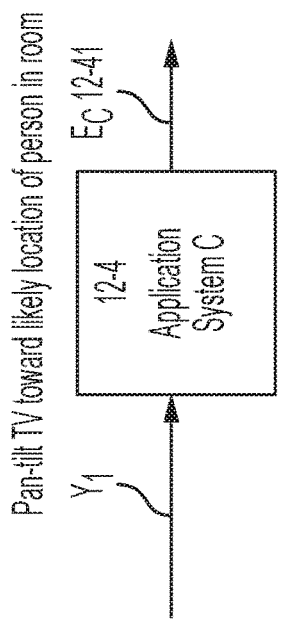

Algorithm 1: Joint Training

Input: Augmented data XA with labels YA,
unlabelled data XU, step size a.
Output: Trained parameters $\Theta F$, $\Theta C$ and $\Theta R$.
while *not done* do
    Sample a batch $X^b_A$ from XA, and a batch $X^b_U$ from XU;
    Take out $X^b_A$'s corresponding labels $Y^b_A$ from YA.
    *Forward Propagation through the Classification Path:*
        Pass $X^b_A$ through $\Theta F$, and $\Theta C$ to obtain $\hat{Y}^b_A$;
        Pass $X^b_U$ through $\Theta F$, and $\Theta C$ to obtain $\hat{Y}^b_U$;
        Evaluate classification loss $LA(\hat{Y}^b, Y^b)$ by Eq. (8);
        Evaluate clustering loss $LU(Y^O)$ by Eq. (11).
    end
    *Forward Propagation through the Reconstruction Path:*
        Pass $X^b_A$ through $\Theta F$, and $\Theta R$ to obtain $\hat{X}^b_A$;
        Pass $X^b_U$ through $\Theta F$, and $\Theta C$ to obtain $\hat{X}^b_U$;
        Evaluate reconstruction loss
        $LR(XA, \hat{X}A, XU, \hat{X}U,)$ by Eq. (12).
    end
    *Back Propagation:*
        Compute the aggregated loss $L$ by Eq. (18);
        $(\Theta F, \Theta C, \Theta R) \leftarrow$
        $(\Theta F, \Theta C, \Theta R) - a \cdot d(\Theta g, {}^d\!/\!_\Theta, \Theta)$.
    end
end

FIG. 22

SYSTEM AND METHOD FOR WIFI-BASED INDOOR LOCALIZATION VIA UNSUPERVISED DOMAIN ADAPTATION

CROSS-REFERENCE TO RELATED APPLICATION

This application claims benefit of U.S. Provisional Patent Application No. 62/910,835, filed on Oct. 4, 2019, in the U.S. Patent and Trademark Office, the disclosure of which is incorporated by reference herein.

BACKGROUND

1. Field

The disclosure relates to location-aware applications, and more particularly, an electronic device for location-aware applications and an operating method thereof. Some embodiments relate to WiFi (also called "Wi-Fi" in the communications industry).

2. Description of Related Art

Location-aware applications can provide convenience and also infotainment. Current applications estimate user locations at granularities exceeding one meter. Location sources are sometimes unavailable indoor (e.g., GPS) or coarse-grained (e.g., user check-ins). WiFi signals are sometimes used for localization systems. WiFi characteristics are also sensitive to 1) the body shapes of different users, and 2) the objects in the background environment. Consequently, systems based on WiFi fingerprints are vulnerable in the presence of 1) new users with different body shapes, and 2) daily changes of the environment, e.g., opening/closing doors.

SUMMARY

Provided herein is a method of location determination by a system including an electronic device with a WiFi transceiver and a neural network based AI model, the method including: receiving, via the WiFi transceiver, a first fingerprint associated with a first person and a first environment, wherein the first person is not a registered user of the system; obtaining, using a shared feature extraction layer of the neural network based AI model and based on operating on the first fingerprint, a first set of feature data; determining, using a reconstruction layer of the neural network based AI model and based on the first set of feature data from the shared feature extraction layer, a reconstruction loss associated with the first person and the first fingerprint; when the reconstruction loss is at or below a threshold: classifying, using a classification layer of the neural network based AI model and based on the first set of feature data from the shared feature extraction layer, the first fingerprint to obtain a first estimated location label of the first person, and outputting, by visible or audible means, an indicator of the first estimated location label of the first person; when the reconstruction loss is above the threshold, performing a registration of the first person.

Also provided herein is a method performed by an electronic device, wherein the electronic device includes a neural network based AI model, the method including: jointly training, based on a reconstruction loss and a clustering loss, feature extraction layers, reconstruction layers, and classification layers of the neural network based AI model, wherein the reconstruction layers are configured to provide the reconstruction loss, and the classification layers are configured to provide the clustering loss; processing a fingerprint to obtain an augmented fingerprint; operating the feature extraction layers on the augmented fingerprint to produce codes; classifying, with the classification layers, the codes, to obtain an estimated location label; and providing an application output based on the estimated location label.

Also provided herein is an electronic device including: one or more memories, wherein the one or more memories include instructions; a WiFi transceiver; and one or more processors, wherein the one or more processors are configured to execute the instructions to: receive, via the WiFi transceiver, a first fingerprint associated with a first person and a first environment, wherein the first person is not a registered user of the electronic device, obtain, using shared feature extraction layers operating on the first fingerprint, a first set of feature data, wherein a neural network based AI model includes the shared feature extraction layer, determine, using reconstruction layers and based on the first set of feature data from the shared feature extraction layer, a reconstruction loss associated with the first person and the first fingerprint, wherein the neural network based AI model includes the reconstruction layer, when the reconstruction loss is at or below a threshold: classify, using classification layers and based on the first set of feature data from the shared feature extraction layer, the first fingerprint to obtain a first estimated location label of the first person, wherein the neural network based AI model includes the classification layers, and output, by visible or audible means, an indicator of the first estimated location label of the first person, when the reconstruction loss is above the threshold, perform a registration of the first person, wherein the one or more processors are configured to perform the registration by: obtaining, via a user interface of the electronic device, an identifier of the first person, obtaining, via the user interface, a ground truth location label of the first person, and obtaining a second fingerprint associated with the ground truth location label; and provide an application output based on the first estimated location label or the ground truth location label.

Also provided herein is a non-transitory computer-readable storage medium storing instructions configured to cause a processor to: receive, via a WiFi transceiver, a first fingerprint associated with a first person and a first environment, wherein the first person is not a registered user of the electronic device; obtain, using shared feature extraction layers operating on the first fingerprint, a first set of feature data, wherein a neural network based AI model includes the shared feature extraction layers; determine, using reconstruction layers and based on the first set of feature data from the shared feature extraction layers, a reconstruction loss associated with the first person and the first fingerprint, wherein the neural network based AI model includes the reconstruction layers; when the reconstruction loss is at or below a threshold: classify, using classification layers and based on the first set of feature data from the shared feature extraction layers, the first fingerprint to obtain a first estimated location label of the first person, wherein the neural network based AI model includes the classification layers, and output, by visible or audible means, an indicator of the first estimated location label of the first person; when the reconstruction loss is above the threshold, perform a registration of the first person, wherein the one or more processors are configured to perform the registration by: obtaining, via a user interface of the electronic device, an identifier of the first person, obtaining, via the user interface, a ground truth location label of the first person, and obtaining a second fingerprint associated with the ground truth location label; and provide an application output based on the first estimated location label or the ground truth location label.

Also provided herein is an apparatus including: an input configured to receive a first plurality of fingerprints and a second plurality of fingerprints, wherein the first plurality of fingerprints includes a first fingerprint, and the first fingerprint is associated with a first person at a first location, and wherein the second plurality of fingerprints includes unlabeled data, and the second plurality of fingerprints includes a second fingerprint; a data augmenter including at least one first processor and at least one first memory, the data augmenter coupled to the input, wherein the data augmenter is configured to generate variational data based on the first plurality of fingerprints; feature extraction layers including at least one second processor and at least one second memory, coupled to the data augmenter, wherein the feature extraction layers are configured to provide first codes and second codes, the first codes are associated with the variational data, and the second codes are associated with the second plurality of fingerprints, wherein a neural network based AI model includes the feature extraction layers; reconstruction layers including at least one third processor and at least one third memory, coupled to the feature extraction layers, wherein the reconstruction layers are configured to produce a reconstructed first fingerprint and a reconstructed second fingerprint, wherein the neural network based AI model includes the reconstruction layers; classification layers, including at least one fourth processor and at least one fourth memory, coupled to the feature extraction layers, wherein the classification layers are configured to predict a second location of a second person, wherein a statistical performance measure of a prediction of the second location of the second person is optimized in a location label domain, wherein the neural network based AI model includes the classification layers; and a controller including at least one fifth processor and at least one fifth memory, wherein the controller is configured to: perform a first update of classification weights of the classification layers, feature extraction weights of the feature extraction layers, and reconstruction weights of the reconstruction layers, based on a first difference between the reconstructed first fingerprint and the first fingerprint, and perform a second update of the feature extraction weights and the reconstruction weights, based on a second difference between the reconstructed second fingerprint and the second fingerprint.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 10 illustrates an exemplary set of feature data corresponding to the first augmented WiFi fingerprint of FIG. 9B, according to embodiments.

FIG. 12A illustrates the classification system of FIG. 1A and a first example embodiment of the application system of FIG. 1A, according to embodiments.

FIG. 12B illustrates the classification system of FIG. 1A and a second example embodiment of the application system of FIG. 1A, according to embodiments.

FIG. 12C illustrates the classification system of FIG. 1A and a third example embodiment of the application system of FIG. 1A, according to embodiments.

FIG. 22 illustrates an exemplary training algorithm, according to embodiments.

DETAILED DESCRIPTION

Figure 1A:
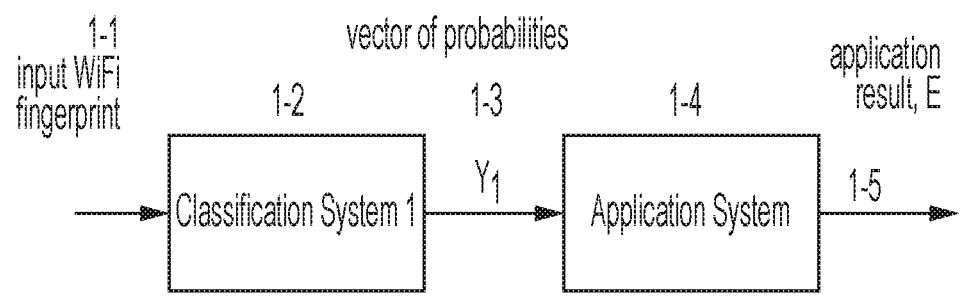
FIG. 1A is a block diagram of an apparatus for performing as a classification system and an application system, according to embodiments.

Embodiments of the disclosure provide proposes a WiFi-based localization system based on domain-adaptation with cluster assumption, named Widora. Widora is able to 1) localize different users with labelled data from only one or two example users, and 2) localize the same user in a changed environment without labelling any new data. To achieve these, Widora integrates two major modules. It first adopts a data augmenter that introduces data diversity using a Variational Autoencoder (VAE). It then trains a domain-adaptive classifier that adjusts itself to newly collected unlabelled data using a joint classification-reconstruction structure. Real-world experiments evaluate embodiments of Widora provided herein. It is demonstrated that, when tested on an unlabelled user, Widora increases average F1 score by 17.8% and improves the worst-case accuracy by 20.2%. Moreover, when applied in a varied environment, Widora outperforms the state of the art by 23.1%.

Localization systems deliver a smart environment that not only senses human locations but also responses accordingly. They provide users with more information about their surroundings, and at the same time assist service providers to deliver the services/contents in a location-aware manner. As a result, numerous mobile applications have been enabled, including geo-social networking, Point-of-Interest (POI) recommendation, and local business/product search. Nevertheless, current sources of location information have many constraints and limitations. For example, Global Positioning System (GPS) signals, being the primarily source of location information nowadays, are unavailable indoor, and are constantly compromised outdoor due to urban canyon effects. User check-ins, as well as locations embedded in tweets and other online posts, are not available 24/7 and have very low resolution (house-level or even lower). All of them fail to support newly emerging applications, such as mobile ads targeting, cashier-less shopping, indoor navigation/tracking, smart home automation and geo-based Augmented Reality and Virtual Reality (AR/VR), which require (sub)meter-level location information at anytime and anywhere.

To meet the availability and resolution requirements, WiFi signals have been studied. WiFi signals have a wavelength of 12.5 cm on the 2.4 GHz frequency channels (or 6.0 cm on 5 GHz channels). They will be affected by human locations/movements as small as the wavelength level, i.e., decimeter level. By using WiFi signals, it is possible to provide decimeter-level location information with either dedicated or Commercial Off-The-Shelf (COTS) devices.

Existing WiFi-based localization systems can be divided into two major categories: anchor-assisted systems and fingerprinting systems. An anchor-assisted system takes the WiFi Access Points (APs) as location anchors, and calculate the distance and/or angles from a user (or his/her devices) to these anchors. One major drawback is that, these systems usually localize devices instead of users. Therefore, they can hardly deal with cases where a user owns multiple devices or carries no device at the moment. The other limitation is that, the coordinates and orientations of WiFi AP antennas need to be measured precisely in advance. Such a measurement process is annoying and fault-prone for users.

Fingerprinting systems sense the physical presence of a user, by passively learning the changes in WiFi propagation caused by human bodies. These systems make no assumption on user-device association, and require no pre-measurement of AP locations/directions. Hence, they are more flexible, practical and easy-to-deploy. To fulfill their localization mission, these systems first extract readings of WiFi propagation characteristics, such as Received Signal Strength Indicator (RSSI) and Channel State Information (CSI), when users locate at different places. These WiFi propagation characteristics, especially the CSI, are very sensitive to human locations. Therefore, by pairing CSI readings with location labels/coordinates, embodiments provided herein create sub-meter-level location fingerprints. Once deployed, a fingerprinting system passively listens to the WiFi signals in the air, extracts the real-time CSI readings, matches them with the fingerprints to estimate/predict user locations on-the-fly.

However, these CSI fingerprints are sensitive to not only the locations but also the human body shapes and the ambient environment. Consequently, a localization system trained on some users' fingerprints may not work for other users with different body shapes. Meanwhile, even for the same user, a daily change in the environment, e.g., closing window shutters, may cause a large degradation on the localization accuracy.

Among all the readings of WiFi propagation characteristics, the CSI is the most informative and representative one. For example, the information contained in one CSI reading is at least 60 times more than that in an RSSI reading (which is another widely used reading). Next, the reasons are explained by discussing some related details of WiFi standards and their implementations on WiFi chips.

WiFi's physical layer follows the IEEE 802.11 standards, which employ the Orthogonal Frequency-Division Multiplexing (OFDM) technology to divide a WiFi frequency channel into 64 frequency subcarriers or even more. This increases the frequency efficiency, by supporting simultaneous transmission of multiple data signals on multiple orthogonal subcarriers. Furthermore, spatial multiplexing is also supported by the standards. The signal flow between one antenna on the transmitter side to the other antenna on the receiver side is called a spatial stream, or stream for short.

The complex signal transmitted on the ith stream and the jth subcarrier may be denoted as $a_{i,j}$. This signal propagates through the WiFi channel, of which channel response is described as $h_{i,j}$. Being altered during the propagation, the signal finally arrives the receiver as $b_{i,j}$. In the frequency domain, this propagation process is modelled as an alteration of the transmitted signal, i.e., $$b_{i,j} = h_{i,j} \cdot a_{i,j}.$$

As mentioned previously, a WiFi signal may travel through multiple paths to reach the receiver. Therefore, $h_j$ is in fact an additive representation of channel responses on multiple paths. To reconstruct $a_{i,j}$, the receiver has to reverse the propagation process by cancelling out $h_{i,j}$ from $b_{i,j}$.

In order to estimate every $h_j$, WiFi chips all implement certain algorithms, which report the estimation results as CSI readings. Take Intel 5300 WiFi chips as an example. For each spatial stream, these chips estimate complex-valued CSI values on 30 subcarriers, which correspond to 60 floating-point values in total. Extracing only 1 real-valued RSSI, which reflects the aggregated signal strength of all the subcarriers is less information. The CSI values contain more detailed information regarding the WiFi signal propagation, and thus can create location fingerprints with much higher resolution than other WiFi characteristics.

While being sensitive to human locations, WiFi CSI fingerprints (as well as RSSI and other fingerprints) are also sensitive to 1) human body shapes and 2) variations in the physical environment. In an example, while standing at the same location, a tall person blocks a WiFi propagation path 0, while a short person does not. At the same time, a big person absorbs more signal power on a path 1, while a small person absorbs less. Consequently, different WiFi CSI readings are observed for different users, even when they are standing at the same location. Another example on the impact of environment changes occurs where the same user is standing at the same location. When a door closes, it creates a propagation path 0 by reflecting the WiFi signals. Yet, when the door opens, this path disappears. As a result, the CSI readings are varied by environment changes, even when the same user is standing at the same location.

To solve this inconsistency issue and provide robust location information for different users in varying environments, embodiments provided here disclose a WiFi-based localization system based on domain-adaptation with cluster assumption Widora, which is able to localize a new user in a changed environment without labelling any new data, and thus saves a huge amount of system calibration time and efforts.

Problem (Challenge) 1: It is unrealistic to collect WiFi fingerprints that cover all possible users and environment variations, not to mention their combinations.

Embodiments provided herein, having the technique name "Widora," address Challenge 1 from the data perspective, by augmenting the collected data. It learns the statistics of the collected data using a data augmenter, and then generates a large amount of synthetic data following these statistics. The data augmenter consists of multiple Variational Autoencoders (VAEs), each of which focuses on the CSI readings of only one location. A VAE first maps the CSI readings of its corresponding location into a latent space that is described by a normal distribution. From this latent space, the VAE produces synthetic CSI readings that are similar but different from the original ones. These synthetic CSI readings are then labelled automatically using the location associated with this VAE, and thus become synthetic fingerprints. By adjusting the standard deviation of the normal distribution (that describes the latent space), the similarity between the synthetic fingerprints and the collected ones is controlled. In this way, Widora is able to cover much more people with fingerprints collected from only one or two users.

Problem (Challenge) 2: Once a system is deployed, labelling new data (i.e., associating newly recorded WiFi CSI readings with locations) is troublesome and even impossible sometimes.

To label a WiFi CSI reading, a reading needs to be associated with the ground-truth location, i.e., the position that the user stood when the reading was collected. However, a system is deployed, this ground-truth information is hard to gather. First, it is troublesome and unfriendly to request people to manual collect data and label them for a new user comes or an environment change. Second, installing an auxiliary system (e.g., LiDARs) is costly, and brings more challenges in synchronization, cross-modality alignment, etc.

Widora addresses Challenge 2 from the model perspective, by extracting and learning from user/environment invariant features. Widora treats the example user (or the original environment) as the source domain, and considers a new user (or the changed environment) as the unlabelled target domain. To adapt to the target domains, Widora embraces a domain-adaptive classifier to utilize the potentially large amount of unlabelled data. This domain-adaptive classifier employs a special Neural Network (NN) design with a Joint Classification-Reconstruction (JCR) structure, which consists of two paths, namely the classification path and the reconstruction path. On one hand, the classification path learns from the CSI fingerprints (i.e., source-domain labelled data), and predicts the locations for new CSI readings. On the other hand, the reconstruction path extracts a general representation of both source-domain labelled data and target-domain unlabelled data, by reproducing them with the same Autoencoder (AE) structure. The classification path is configured to use the representation produced by the reconstruction path, through sharing the same feature extraction layers. In this way, the classification can adapt to new users and/or environment changes using the representation updated by unlabelled data. Widora outperforms the vanilla version of the JCR structure proposed by M. Ghifary et al. as DRCN, as well as its predecessor WiDo proposed by X. Chen et al., mainly by applying the following three techniques. i) While the reconstruction path in DRCN is only trained with target domain data, the counterpart in Widora (and WiDo) learns one identical representation on both source and target domains. By doing this, the extracted features focus more on the commonness between two domains and de-emphasize the domain difference. ii) While the classification path of WiDo only focuses on the classification loss of labelled data, the counterpart in Widora employs an additional clustering loss to drive decision boundaries away from high-density areas, and thus reduces class ambiguity of unlabelled data. iii) Instead of using an alternative training algorithm as in DRCN and WiDo, Widora adopts a more efficient joint training algorithm.

Widora is different from the Domain-Adversarial Neural Networks (DANNs) and their variants. Although DANNs are able to utilize data without class labels, they still need to know whether a data point comes from the source domain or not. DANNs are still limited to a special kind of labelled data, of which the labels are the domains instead of the classes. Unfortunately, in real applications, it is difficult for a system to collect these ground-truth domain labels (i.e., identification of a user or an environment change). In contrast to DANNs, Widora conducts domain adaptation with purely unlabelled data that have neither class labels nor domain labels. Therefore, Widora can adapt to unknown users or unpredictable environment variations with zero human intervention.

Experiments have been conducted on a localization testbed built upon COTS WiFi devices. The experiments were conducted in a furnished room (FIG. 23), with locations scattered in the room by a minimum interval of 70 cm. To evaluate the impact of user diversity, 9 volunteers with different heights, weights, and genders were invited to participate in the experiments. The results showed that, in the presence of unknown users, Widora outperformed the baseline AutoFi by 17.7%, 14.9% and 17.8%, in terms of the average recall, precision and F1 score, respectively. The worst-cast accuracy across different people was also boosted by 20.2%. Meanwhile, compared to WiDo, Widora increased the average recall, precision and F1 score by 6.0%, 5.7% and 6.0%, respectively. Embodiments of WiDo are also presented herein. For WiDo, augmented fingerprints are not used, and a cluster loss is not used.

In addition, to test the robustness against environment variations, different changes are introduced to the environment, such as closing a glass door, opening metal shutters, and removing a chair from the room. CSI data is collected before and after every environment change, and treated the data collected before (after) a change as the source (target) domain data. Using these source and target domain data, different localization systems are evaluated. Compared to the baseline AutoFi and WiDo, Widora increases the average localization accuracy by up to 23.1% and 15.6%, respectively.

Fingerprinting systems have been developed in conjunction with (deep) AI/ML models. The core idea is to record WiFi propagation characteristics, label them with the locations where users/devices are during the recording, and train an AI/ML model using the WiFi characteristics and the labels. The combinations of WiFi propagation characteristics and their corresponding location labels are called WiFi localization fingerprints or fingerprints for short.

Device-oriented fingerprints have been widely utilized. These fingerprints captured how the signal propagation looks like when a user-carried device is located at a certain place. For instance, Z. Yang et al. adopted WiFi RSSI fingerprints between a smartphone and WiFi APs in their LiFS system, which conducted auto-labelling of the fingerprints using accelerometers integrated in smartphones. P. Wilk et al. developed a crowdsourcing mechanism to collect WiFi RSSI fingerprints. J. Yang et al. applied ensemble learning techniques to further improve the fidelity and robustness of crowd-sourced RSSI fingerprints. To deal with outdated fingerprints, C. Chu et al. created a particle filter based calibration method to update RSSI fingerprints. In order to achieve higher resolution, more informative WiFi characteristics. For example, S. Sen et al. employed WiFi CSI to develop the PinLoc system, which achieved a 89% meter-level localization accuracy with a clustering-based classification algorithm. Using WiFi CSI, X. Wang et al. in combined the offline training with an online probabilistic data fusion based on the radial basis function. H. Chen et al. designed ConFi, which cast CSI into feature images and feeds them into a Convolutional Neural Network (CNN) that models localization as an image classification problem. WiFi multipath delay profiles have been utilized by A. Zayet et al. to achieve better performance than RSSI as well. Drawbacks: However, these device-oriented fingerprints exhibited several limitations including user-device ambiguity and the burden of carrying devices/sensors all the time.

It has been proved that, device-free fingerprints achieved more or less the same performance as device-oriented ones, while providing a user-centered and convenient localization service. These device-free fingerprints described how users' locations/movements altered the signal propagation between two stationary devices. By learning the association between the RSSI/CSI alterations and the locations, the systems can later localize the body of a user directly. For example, L. Chang et al. adopted RSSI device-free fingerprints in the proposed system FitLoc, which projected the fingerprints into a latent space so as to capture environment-independent features. Yet, Fitloc's implementation only worked in Line-Of-Sight (LOS) scenarios with dedicated devices. Working with COTS devices, J. Xiao et al. designed a system named Pilot, which used the maximum a priori probability (MAP) algorithm to estimate locations from WiFi CSI fingerprints.

S. Shi et al. developed a Bayesian filtering approach using CSI fingerprints, and managed to apply the algorithm to an untrained user. K. Chen et al. tackled the problem from the perspective of computer visions, and developed a Convolutional Neural Network for localization, alongside with an interpreting framework to explain the features learned by the CNN. To conduct effective feature selection, T. Sanam et al. applied generalized inter-view and intra-view discriminant correlation analysis to extract distinguishable CSI features for localization. Drawbacks: The above-mentioned device-free fingerprinting systems did not fully consider the fingerprint inconsistency issue, and thus might perform poorly in the presence of new users or environment changes.

To tackle this fingerprint inconsistency issue, several fingerprint database updating methods have been proposed. For instance, L. Chang et al. developed iUpdater, Regularized Singular Value Decomposition (RSVD) method to reconstruct the RSSI fingerprinting matrix with a few new labelled fingerprints. X. Chen et al. developed AutoFi to calibrate the localization profiles in an unsupervised manner, using a polynomial source-target mapping function and an autoencoder. The fingerprint updating of AutoFi was triggered by a special event, where the area of interest was detect as empty. X. Rao et al. proposed time-triggered updating method to replace the expired fingerprints with new ones, with the help of a fully connected NN. Drawbacks: These fingerprint updating methods relied on certain (event-based or temporal) indications on whether the environment/user was changed. In other words, these methods required implicit domain labels to differentiate CSI fingerprints before and after an environment/user change. However, these implicit domain labels would be either inaccurate or unavailable in real scenarios, leading to potentially large performance degradation.

Other CSI Sensing Systems: Apart from localization, the CSI data have also been utilized for other human centered applications. W. Xi et al. proposed a CSI approach to human counting by establishing a monotonic relationship with the percentage of nonzero elements in dilated CSI matrices.

Y. Zheng et al. developed Widar3.0, which translated the Doppler frequency shift into a body-coordinate velocity profile, which was later fed into a combined RNN-CNN for human gesture recognition. A. Pokkunuru et al. designed user identification system NeuralWave, which extracted the gait-induced signatures from CSI data and used a deep CNN to distinguish the gait biometrics of different persons.

Korany et al. proposed XModal-ID, which learned a mapping from the CSI readings to video footage, so as to extract user identification information. In order to eliminate the environment dependency in activity recognition, W.

Jiang et al. proposed an adversarial network to extract the commonness shared by different CSI domains.

In embodiments disclosed herein, in order to conduct purely unsupervised domain adaptation with neither location labels nor domain labels, WiDo is based on a joint classification-reconstruction NN structure. Such a structure allows WiDo to extract generic features from unlabelled data without knowing their domains.

In embodiments disclosed herein a clustering loss and a more efficient joint training algorithm are provided, and labelled Widora. While the clustering loss forces the decision boundaries to move away from high-density areas, the joint training algorithm converges quickly with only a small amount of data. Therefore, Widora further improves the localization performance over WiDo. Both approaches are useful.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) or CNN is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c.

As mentioned above, WiFi's physical layer follows the IEEE 802.11 standards, which employ the Orthogonal Frequency-Division Multiplexing (OFDM) technology to divide a WiFi frequency channel into 64 frequency subcarriers or even more. This increases the frequency efficiency, by supporting simultaneous transmission of multiple data signals on multiple orthogonal subcarriers. Furthermore, spatial multiplexing is also supported by the standards. Separate data signals can be transmitted from and/or to multiple antennas. The signal flow between one antenna on the transmitter side to the other antenna on the receiver side is called a spatial stream, or stream for short.

As mentioned above, the complex signal transmitted on the ith stream and the jth subcarrier may be denoted as $a_{i,j}$. This signal propagates through the WiFi channel, of which channel response is described as $h_{i,j}$. Being altered during the propagation, the signal finally arrives the receiver as $b_{i,j}$. In the frequency domain, this propagation process is modelled as an alteration of the transmitted signal, i.e., $$b_{i,j} = h_{i,j} \cdot a_{i,j}. \qquad (1)$$

As mentioned previously, a WiFi signal may travel through multiple paths to reach the receiver. Therefore, hj is in fact an additive representation of channel responses on multiple paths. To reconstruct $a_{i,j}$, the receiver has to reverse the propagation process by cancelling out $h_{i,j}$ from $b_{i,j}$. In order to estimate every hj, WiFi chips all implement certain algorithms, which report the estimation results as CSI readings, for example, Intel 5300 WiFi chips. For each spatial stream, these chips estimate complex-valued CSI values on 30 subcarriers, which correspond to 60 floating-point values in total. CSI values contain more detailed information regarding the WiFi signal propagation than RSSI.

In some embodiments, a user interacts with an electronic device. The electronic device may be a television set (TV). The electronic device may include a classification system and application system. These together may be referred to below as "the system."

The system may ask a person if they are a new user. If the new user answers, for example, "yes, I am," the system may record data of the user and perform an update of various layers in order to support the user. In some embodiments the data is a user profile. Data of the user may include name, gender, height and weight. In some embodiments, the system may ask the user if the user wishes to create a new profile. If the new user answers, for example, "here is my profile," the system accepts the profile.

Embodiments provided herein provide a device-free localization service.

At a setup stage, an owner can collect WiFi CSI data (fingerprints) and label them with position labels.

After the setup, if the system is applied to a new user, the location accuracy if the new user may generally be lower than the accuracy with respect to the owner.

If more data of the new user is collected, the location accuracy of the new user increases. The new user does not need to label the newly collected data.

In some embodiments, labelled data go through an augmenter. Labelled data and unlabelled data go through the same feature extractor. Labelled data go through a classifier to produce an estimated position (e.g., soft value or label). Unlabelled data first go through a reconstructor.

FIG. 1A illustrates an input WiFi fingerprint 1-1 provided to a classification system 1 (item 1-2). The classification system 1 provides an output Y1 (item 1-3) which may be a vector of probabilities. Each element of the vector is associated with a position label, for example the position labels of FIG. 1B. Y1 is input to an application system 1-4 which provides an application result, E (item 1-5).

Figure 1B:
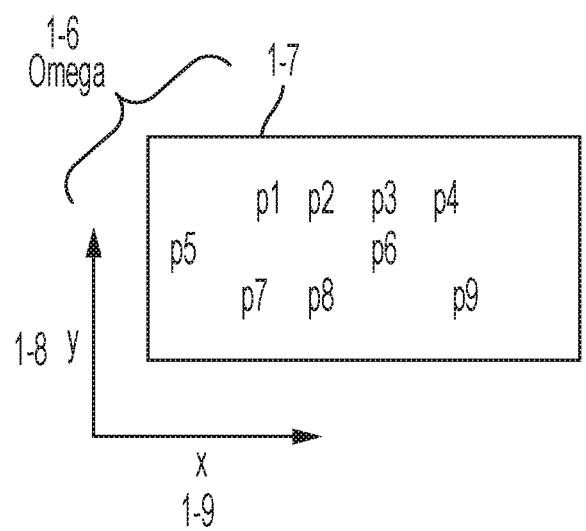
FIG. 1B is an illustration of a geographic area with exemplary position labels, according to embodiments.

FIG. 1B illustrates an environment 1-7. The environment may be for example, a room with a desk, chairs, doors, windows, etc. Within the environment, locations are associated with a set of labels Omega; Omega includes p1, p2, p3, p4, p5, p6, p7, p8, and p9 (these are exemplary). X coordinate 1-9 and y coordinate 1-8 are position coordinate axes.

The classification system 1 can process a fingerprint from registered user or a guest (unknown user), and provide the output Y1. Y1 may then be processed by the application system to provide the application result, E. Thus FIGS. 1A and 1B are an overview of location-aware services to people.

Figure 2:
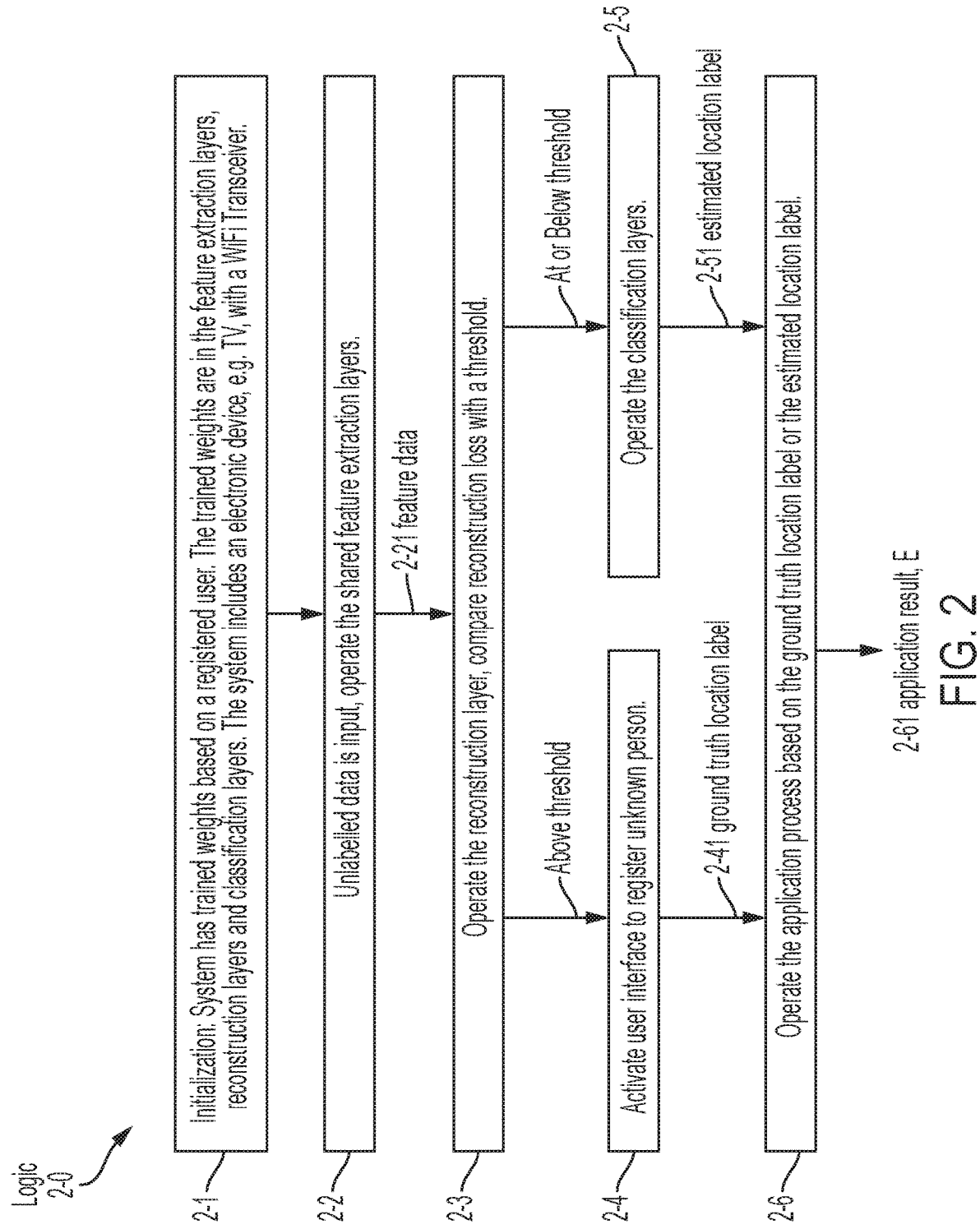
FIG. 2 is a logic flow of the classification system of FIG. 1A receiving unlabeled data and the application system of FIG. 1A providing an application result, according to embodiments.
Figure 5:
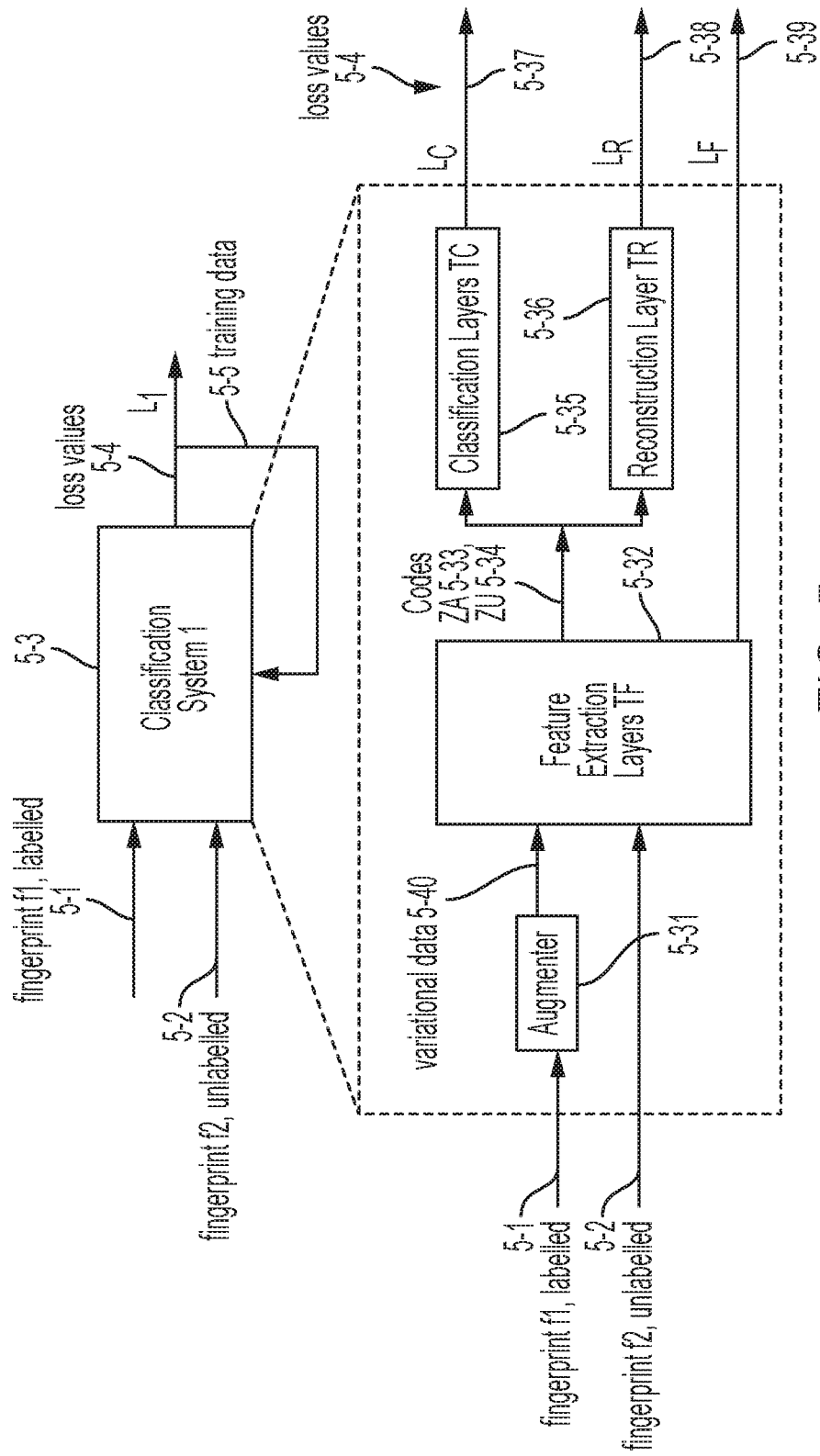
FIG. 5 is a block diagram illustrating a zoom-in representation of the classification system of FIG. 1A. Loss values from each of feature extraction layers, reconstruction layers, and classification layers are illustrated, according to embodiments.

FIG. 2 illustrates exemplary logic 2-0 associated with FIGS. 1A-1B. At 2-0, the system is initialized. At 2-1, weights of layers are trained based on a registered user. Exemplary layers are shown in FIG. 5 and described below. At 2-2, unlabelled data is input and a shared feature extraction layer is operated and produces feature data (item 2-21). Generally, feature data is referred to with the label "Z" (ZA for augmented and ZU for unlabelled). The feature data 2-21 is input to a reconstruction layer, which, at 2-3, reconstructs a fingerprint associated with the feature data 2-21. The reconstruction layers have previously been trained (see, e.g., FIG. 11). Note that no corresponding ground truth fingerprint exists for feature data 2-21, generally. The reconstruction layer evaluates an error measure of the reconstructed fingerprint and produces a reconstruction loss. This loss may be based on a conditional entropy. Since a loss is calculated weights may be updated even without a ground truth fingerprint.

If the reconstruction loss is above a predetermined threshold, the logic flows to 2-4 and a user interface is activated to register an unknown person. During the registration, a ground truth label of the unknown person may be obtained (item 2-41).

If the reconstruction loss is below the predetermined threshold, logic flows to 2-5. The classification layer is operated on the feature data 2-21, a value Y1 is produced, and an estimated location label (item 2-51). The estimated location label may be obtained from Y1 using an argmax function or a softmax function.

Finally, the logic flows (via either 2-4 or 2-5) to 2-6 and the application process is operated based on the ground truth location label 2-41 or the estimated location label 2-51, producing an application result, E (item 2-61).

Additional logic flows are provided herein to describe further details and/or variations of the logic 2-0.

Figure 3:
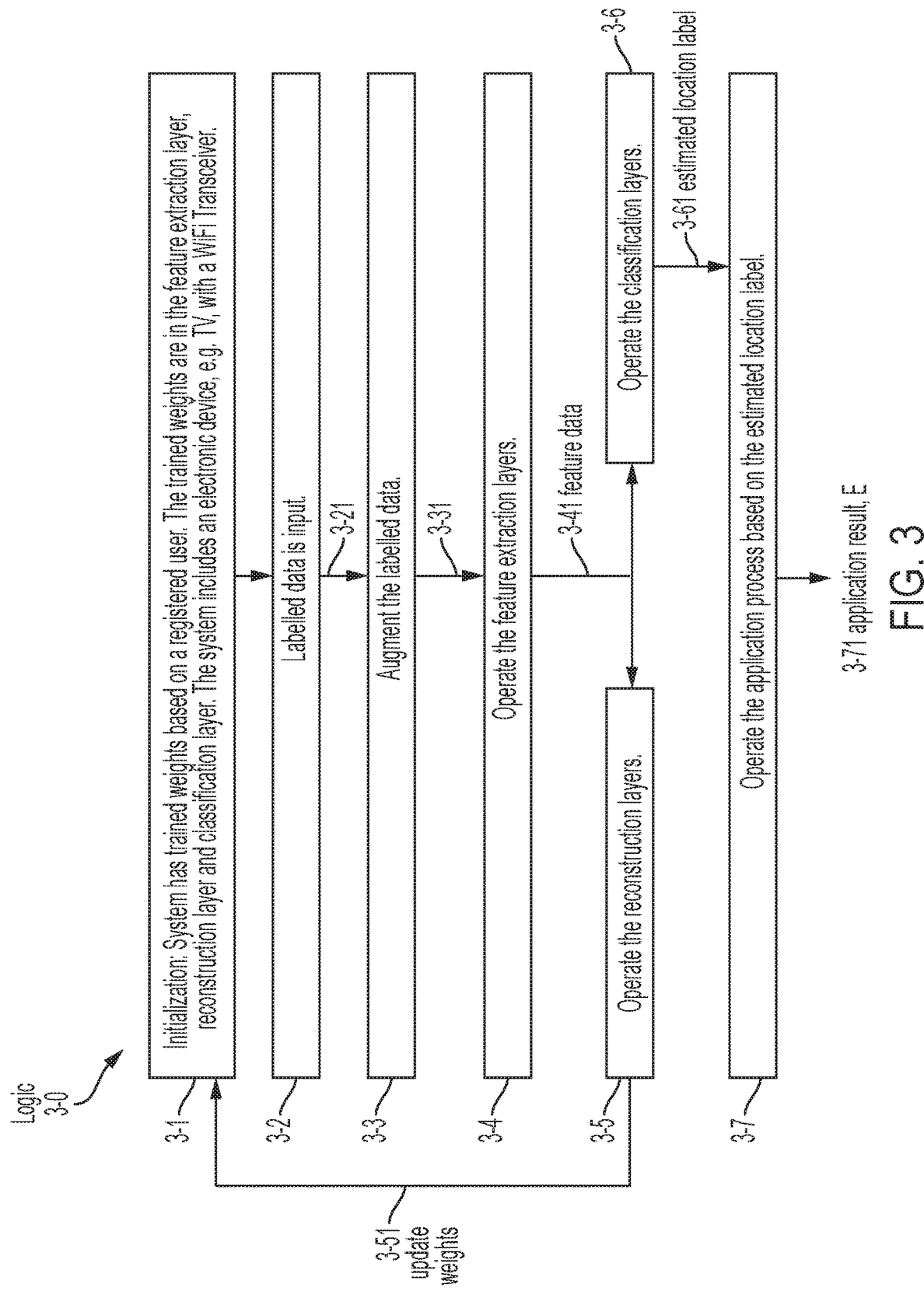
FIG. 3 is a logic flow of the classification system of FIG. 1A receiving labeled data, augmenting the labelled data, updating weights, and the application system of FIG. 1A providing an application result, according to embodiments.

FIG. 3 illustrates exemplary logic 3-0. At 3-1, the system has been trained based on a registered user, such as, for example, a person who owns the electronic device of FIG. 1A.

At 3-2, labelled data is input. Labelled data is a fingerprint along with a ground truth label telling where the person was at in the environment of FIG. 1B. The data may be input by a conversational procedure between the electronic device and the person. For example: 1. "I want to input data" (from person). 2. "where are you now?" (from electronic device). 3. "I am sitting on the sofa" (from person). 4. The electronic device collects a WiFi fingerprint from one or more WiFi devices (such as access points), and associates the fingerprint with a person at a location label of "sitting on the sofa."

At 3-21, the labelled data is augmented (or autoencoded, see FIG. 17) to produce an augmented fingerprint. Augmenting the data can include determining statistical moments of the labelled fingerprint such as mean and variance and generating a random realization from a distribution with the determined mean and variance. The random realization is called augmented data. Several such random realizations are obtained from a single determined distribution (see FIGS. 6A, 6B, 7A, 7B, 7C, 9A, 9B, 9C); thus generally an augmented fingerprint includes several fingerprint waveforms.

The feature extraction layer, at 3-4, then operates on the augmented fingerprint and produces feature data (item 3-41). One feature data vector (or set of feature of data) is associated with each input fingerprint. In some embodiments, XA producing ZA is one fingerprint producing one feature vector, thus one labelled X may produce many ZA vectors. In general, one X will be augmented into multiple XA. Then one XA will produce one ZA. Generally, there will be one feature data vector the labelled fingerprint, and one feature data vector for each of the random realizations underlying the augmented fingerprint. Thus FIG. 8 corresponds to FIG. 7B (see below).

The feature data 3-41 flows to both the reconstruction layers and to the classification layers. The reconstruction layers have a ground-truth label for the labelled fingerprint 3-21 and generate a loss used to train the layers (update weights, item 3-51, this action may be performed after 3-71 described below).

The classification layers operate on the feature data 3-41 at 3-6 and produce Y1 (not shown in FIG. 3) and an estimated label 3-61.

At 3-7, the application process operates on the estimated location label 3-61 and produced an application result, E (item 3-71).

Figure 4:
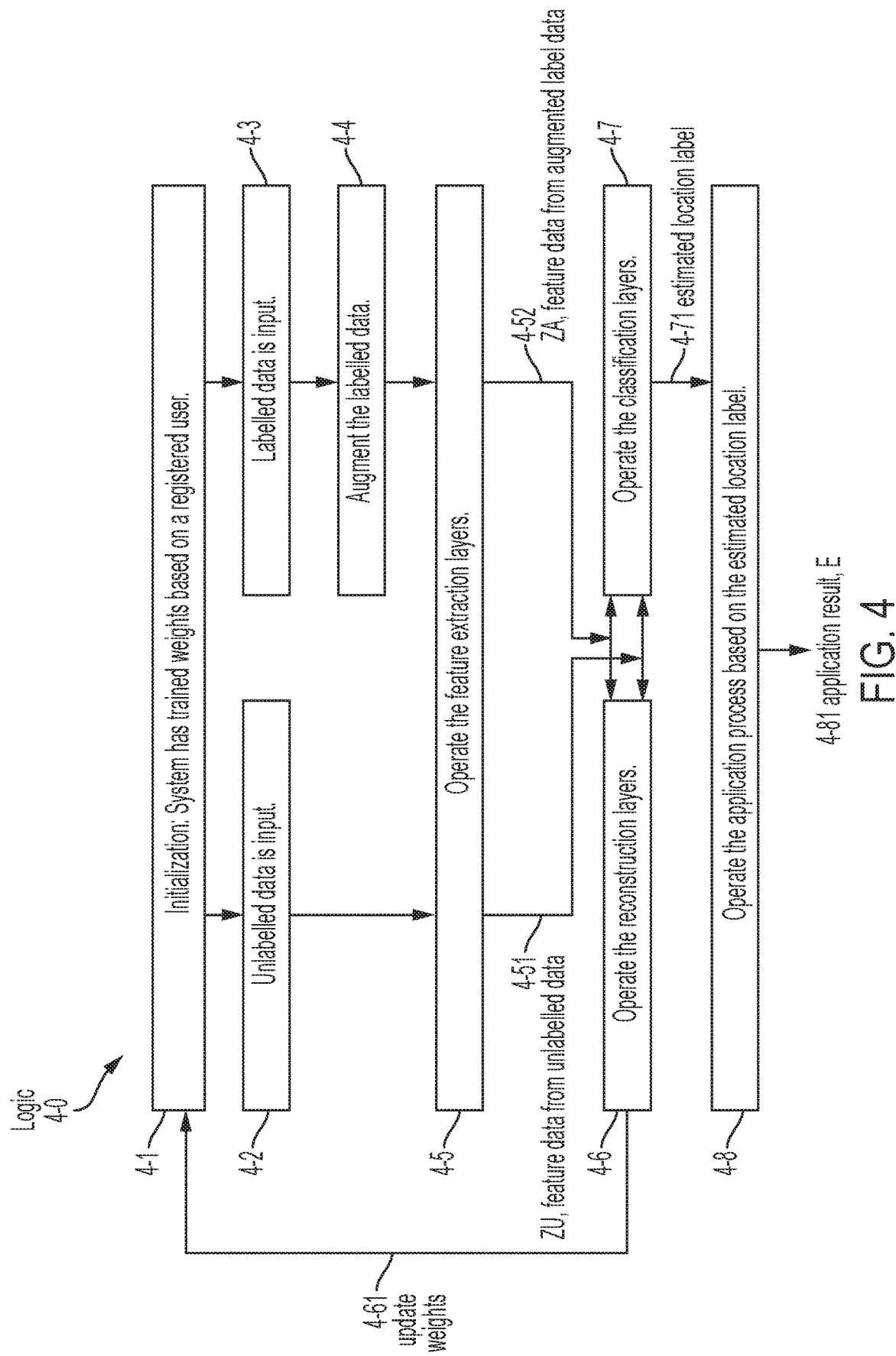
FIG. 4 is a logic flow of the classification system of FIG. 1A receiving unlabeled data and labeled data, augmenting the labelled data, operating a shared feature extraction layer, updating weights, and the application system of FIG. 1A providing an application result, according to embodiments.

FIG. 4 illustrates logic flow 4-0 which has some overlap with FIGS. 2 and 3. Initially, the system has been trained (shown at 4-2). More than one activity occurs in logic flow 4-0, since both unlabelled data (an unlabelled fingerprint) is input (at 4-2) and labelled data is input (at 4-3). The labelled data is augmented at 4-4 to produce an augmented fingerprint.

The feature extraction layers operate on both the unlabelled data and the augmented fingerprint resulting in a set of feature data ZU (item 4-51) from the unlabelled data and a (plural) set of feature data ZA (item 4-52) from the augmented fingerprint.

Operation of 4-6, 4-7 (producing label 4-71), and 4-8 (producing 4-81) are similar to the corresponding events of logic 3-0 in FIG. 3.

FIG. 5 provides further details of training of the classification system 1 (item 5-3 in FIG. 5). Item 5-3 can be implemented as, for example, a neural network based AI model. A labelled fingerprint f1, item 5-1 is input to 5-3. Also, an unlabelled fingerprint f2, item 5-2, is input to 5-3. The classification system 1 (item 5-3) processes these and produces loss values L1 (item 5-4) used as training data (item 5-5).

Classification System 1 may be implemented as a neural network based AI model consisting of various neural network layers. For example, the neural network based AI model of Classification System 1 may include feature extraction layers, classification layers and reconstruction layers. Generally and in one example, a neural network may be a computing system made up of a number of interconnected processing elements, which process information by their response to inputs. These processing elements may be organized in layers.

A zoom-in picture is shown in FIG. 5 describing internal functions of the classification system 1. The functions may be realized as software executing on a CPU, as dedicated hardware, as off the shelf software configured according to FIG. 5 or any combination. The zoom-in illustration shows an augmenter 5-31 (also called autoencoder, FIG. 17), feature extraction layers TF (item 5-32, also referred to as ΘF) which output codes ZA (item 5-33) and ZU (item 5-34). ZA and ZU are input to classification layers TC (item 5-35, also referred to as ΘC) and reconstruction layers TR (item 5-36, also referred to as ΘR). TC outputs loss values LC (item 5-37); TR outputs loss values LR (item 5-38), and TF outputs loss values LF (item 5-39). These loss values are processed individually or jointly to train the layers. See FIG. 10.

Figure 6A:
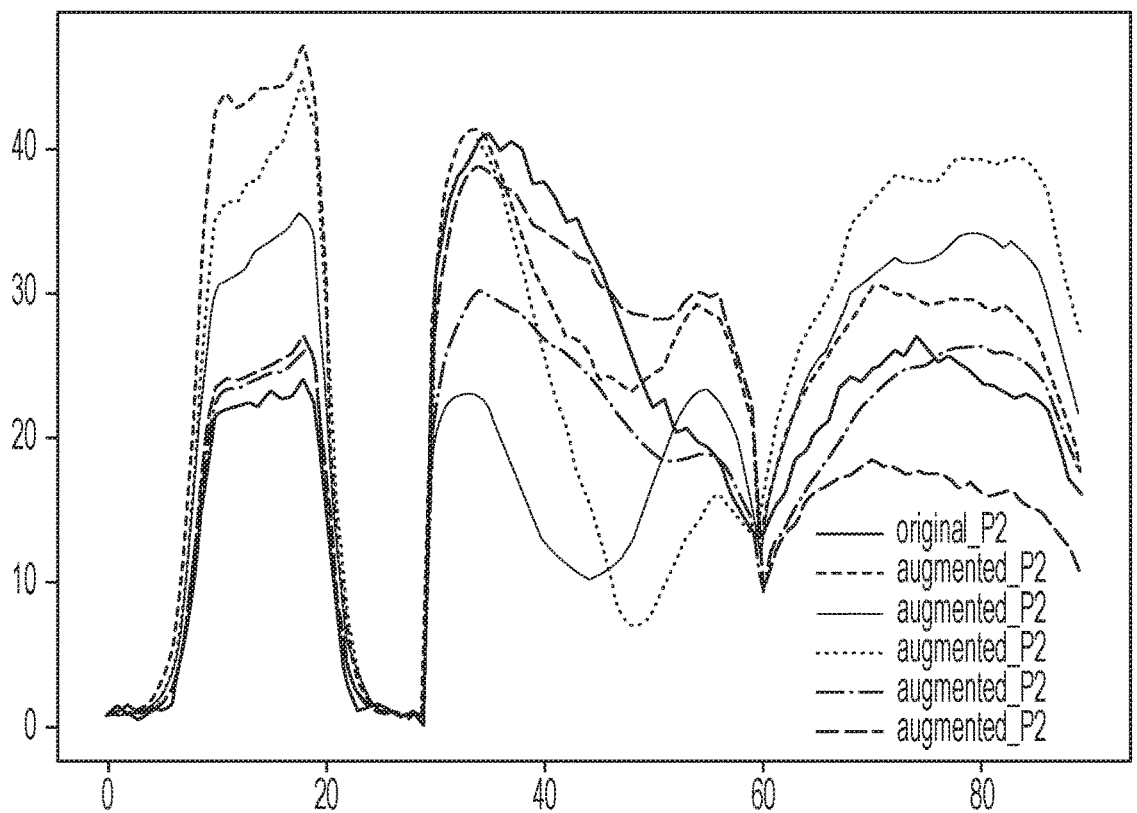
FIG. 6A and FIG. 6B illustrate exemplary WiFi fingerprint data and augmented fingerprint data, according to embodiments.

FIG. 6A illustrates a labelled finger print at location P1 and five random realizations based on statistics of the labelled finger print at location P1.

Figure 6B:
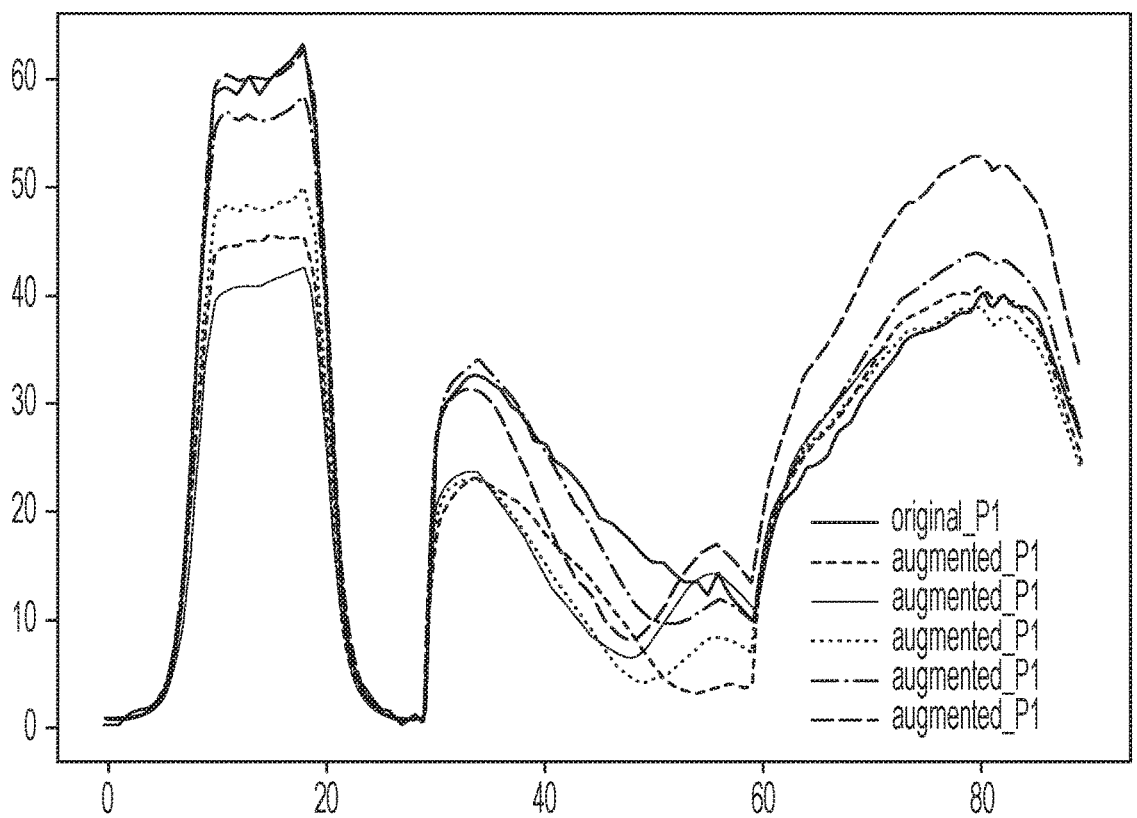

FIG. 6B illustrates a labelled finger print at location P2 and five random realizations based on statistics of the labelled finger print at location P2.

In FIGS. 6A, 6B, 7A, 7B, 7C, 9A, 9B, and 9C, the ordinate is magnitude square value of CSI, and the abscissa is subcarrier index (frequency).

FIG. 6 illustrates ZA for the fingerprint information of FIGS. 6A and 6B.

Figure 7A:
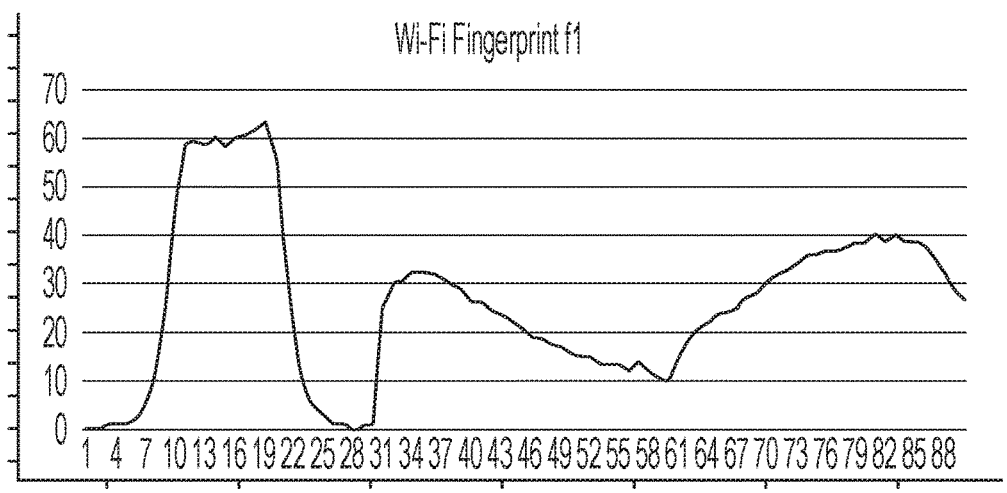
FIG. 7A illustrates an exemplary labelled WiFi fingerprint for label p1, according to embodiments.
Figure 7B:
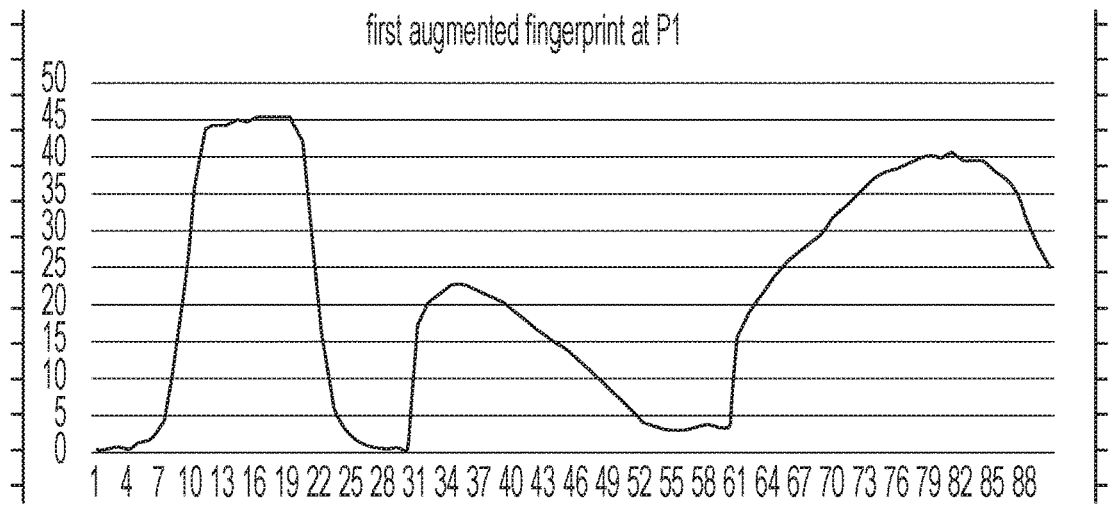
FIG. 7B illustrates a first exemplary augmented WiFi fingerprint based on the WiFi fingerprint of FIG. 7A, according to embodiments.
Figure 7C:
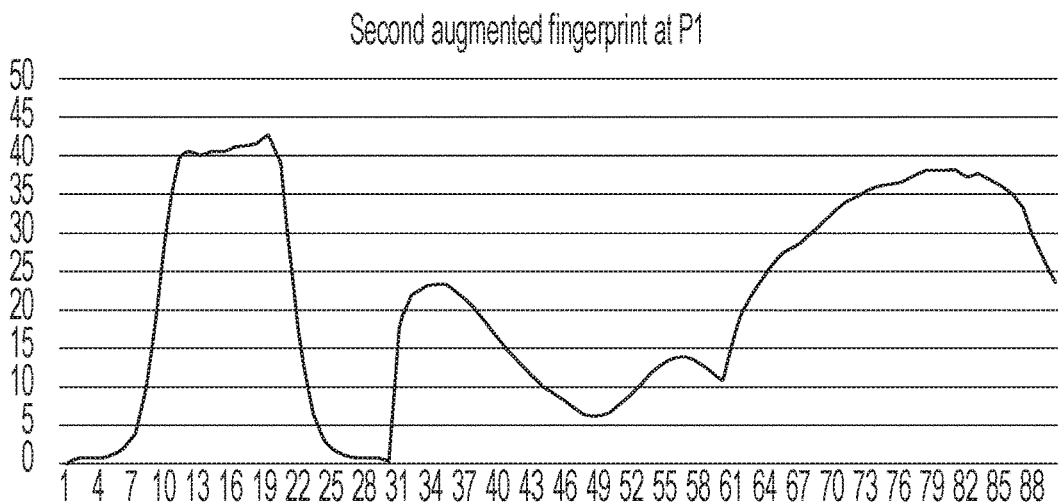
FIG. 7C illustrates a second exemplary augmented WiFi fingerprint based on the WiFi fingerprint of FIG. 7A, according to embodiments.

FIG. 7A illustrates a labelled fingerprint at P1. FIGS. 7B and 7C illustrate random realizations generated based on statistics (moments) of the labelled fingerprint of FIG. 7A at P1.

Figure 8:
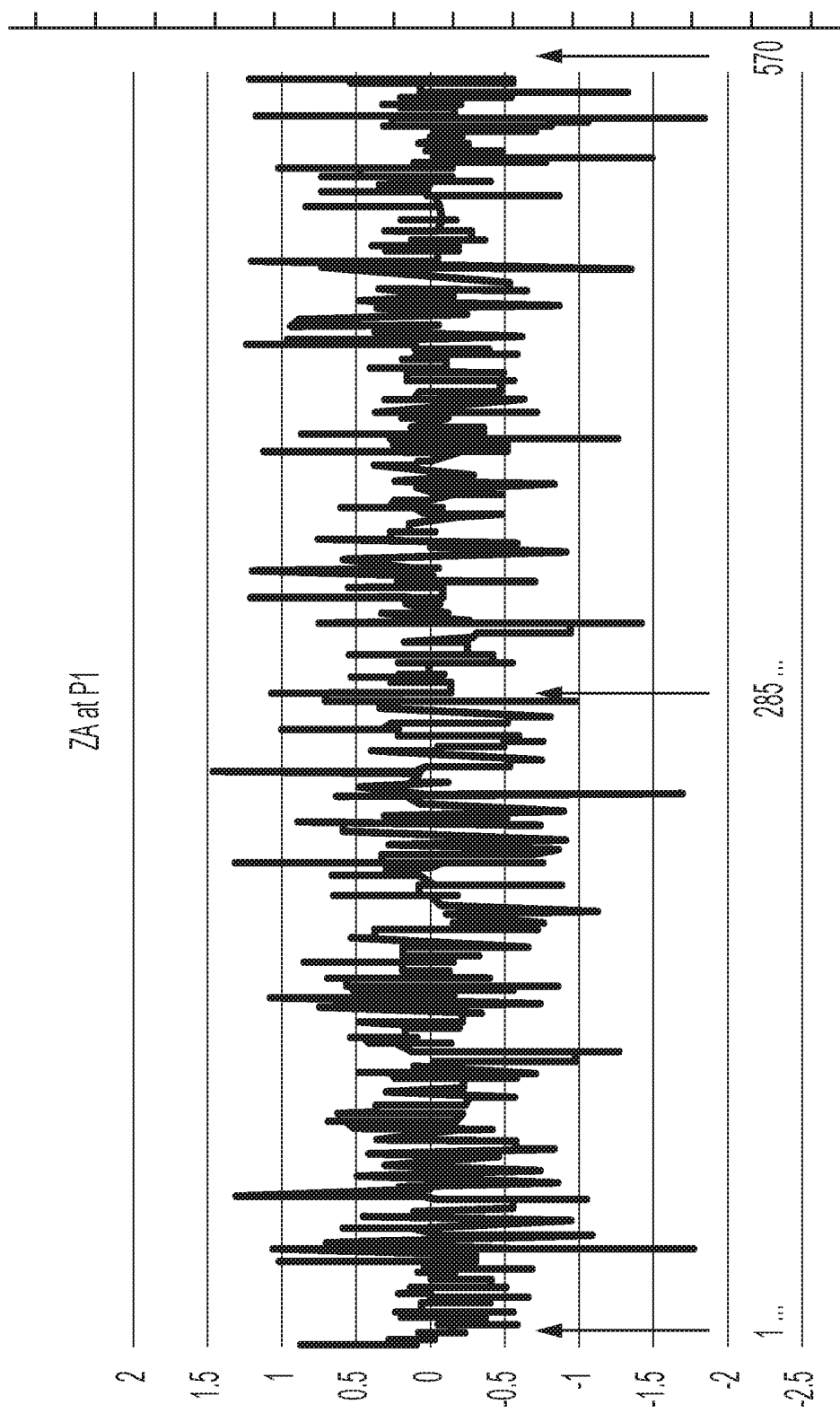
FIG. 8 illustrates an exemplary set of feature data corresponding to the first augmented WiFi fingerprint of FIG. 7B, according to embodiments.

FIG. 8 illustrates a set of feature data corresponding to the augmented data of FIG. 7B. In FIG. 8, the ordinate is a dimensionless measure related to information and the abscissa is a feature vector index.

Figure 9A:
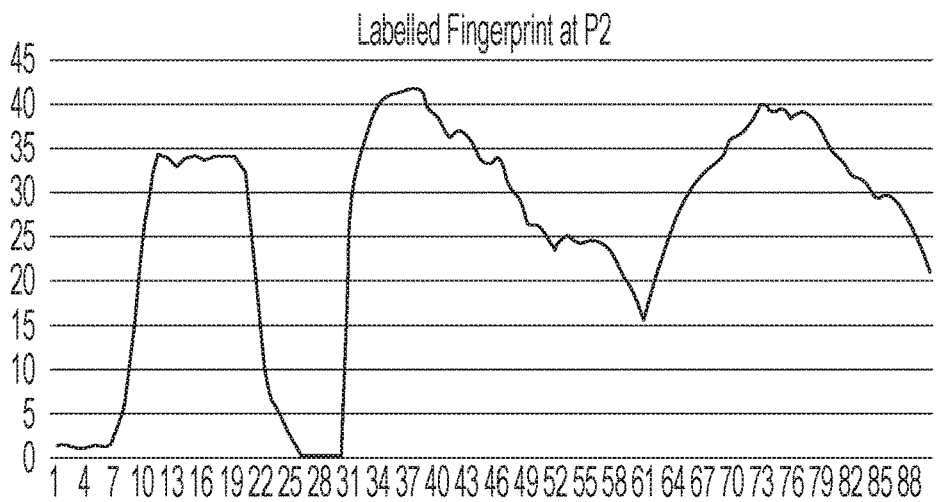
FIG. 9A illustrates an exemplary labelled WiFi fingerprint for label p2, according to embodiments.
Figure 9B:
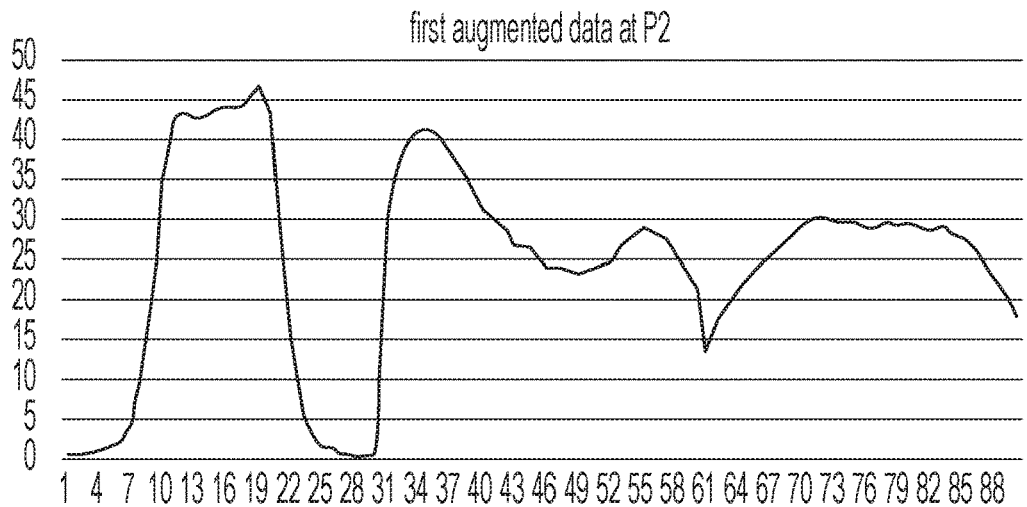
FIG. 9B illustrates a first exemplary augmented WiFi fingerprint based on the WiFi fingerprint of FIG. 9A, according to embodiments.
Figure 9C:
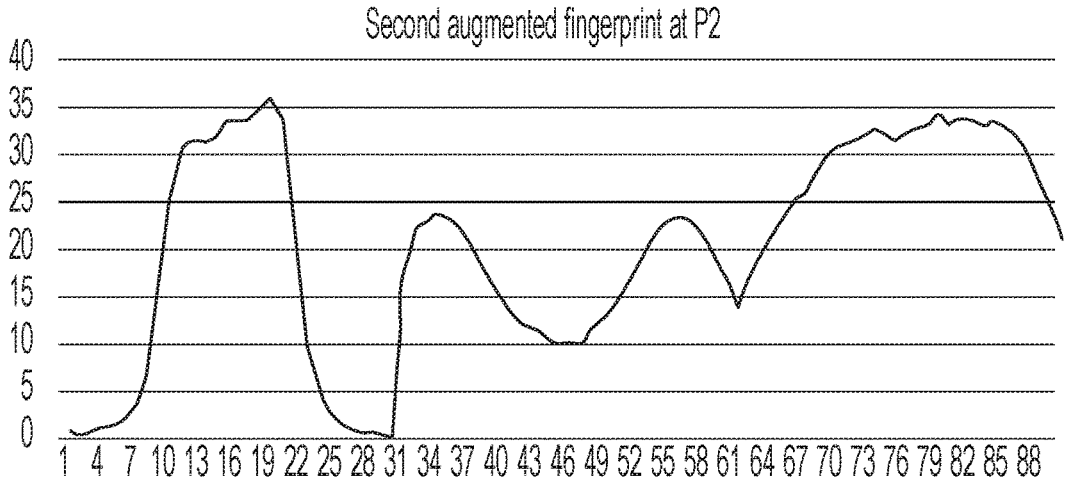
FIG. 9C illustrates a second exemplary augmented WiFi fingerprint based on the WiFi fingerprint of FIG. 9A, according to embodiments.

FIGS. 9A, 9B, and 9C are similar to FIGS. 7A, 7B, and 7C except with respect to the label p2. FIG. 9 is similar to FIG. 9.

Figure 11:
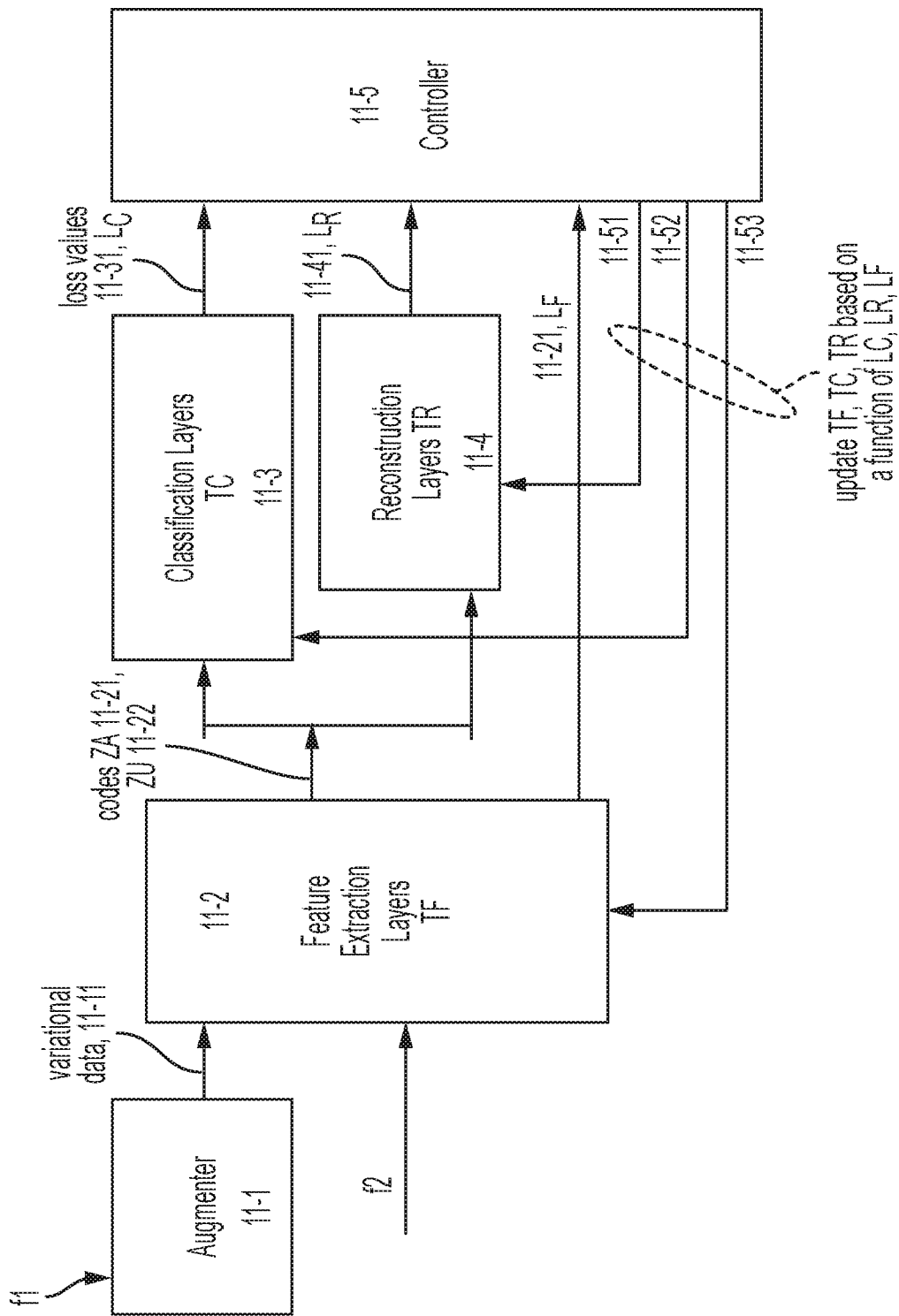
FIG. 11 illustrates an exemplary controller for updating layers, according to embodiments.

FIG. 11 illustrates values fed back for training.

Similar to description with respect to FIG. 5, a labelled fingerprint f1 is input to an augmenter 11-1 which outputs Variational data 11-11 (also referred to as augmented fingerprint). Feature extraction layers TF output codes ZA 11-21, and ZU, 11-22. An unlabelled fingerprint, f2, is input directly to TF.

A controller 11-5 processes loss values 11-31 (LC), 11-41 (LR), and 11-21 (LF) to produce feedback functions 11-51, 11-52 and 11-53. These functions are used to update, respectively, TR (item 11-4), TC (item 11-3), and TF (item 11-2).

FIGS. 12A, 12B, 12C, 12D, 12E, and 12F illustrate various embodiments of the application system A.

Figure 12D:
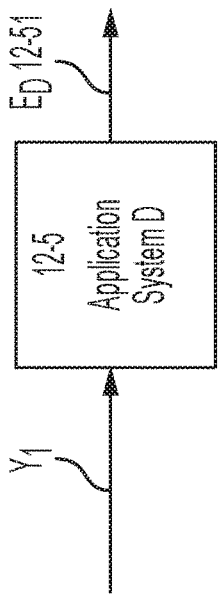
FIG. 12D illustrates the classification system of FIG. 1A and a fourth example embodiment of the application system of FIG. 1A, according to embodiments.

FIG. 12A illustrates an input fingerprint f1 or f2 (item 12-10) input to the classification system 1 (item 12-1). In FIGS. 12B, 12C, 12D, 12E, and 12F the classification system 1 is implied and not shown.

FIG. 12A illustrates an exemplary embodiment in which application system A (item 12-2) produces an output EA (item 12-21). In this example, EA is the event of estimating that no one is present in a room, and turning off a TV.

FIG. 12B illustrates an exemplary embodiment in which application system B (item 12-3) produces an output EB (item 12-31). In this example, EB is the event of estimating a person's location in a room, and beam forming sound from the TV to the location of the person. Beamforming sound means creating a constructive audio pattern of sound waves so that a pleasant sound effect is experienced by a person listening at the location corresponding to the estimated location label.

FIG. 12C illustrates an exemplary embodiment in which application system C (item 12-4) produces an output EC (item 12-41). In this example, EC is the event of estimating a person's location in a room, and pan-tilting a TV toward the location corresponding to the estimated location label. Pan-tiling means rotating the TV screen about a vertical axis and rotating the TV screen about a horizontal axis to direct the screen to the person.

FIG. 12D illustrates an exemplary embodiment in which application system D (item 12-5) produces an output ED (item 12-51). In this example, ED is the event of estimating a person's location in a room, and updating an augmented reality display for a person at the location corresponding to the estimated location label. An augmented reality display provides three dimensional imagery to a person wearing, for example, a special pair of display glasses or a viewer on their head in front of their eyes.

Figure 12E:
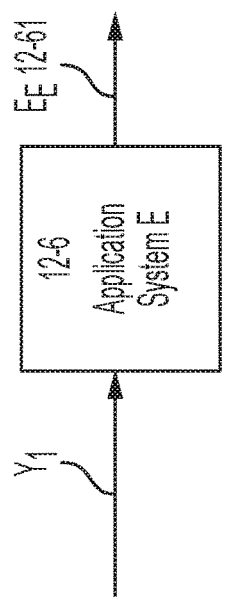
FIG. 12E illustrates the classification system of FIG. 1A and a fifth example embodiment of the application system of FIG. 1A, according to embodiments.

FIG. 12E illustrates an exemplary embodiment in which application system E (item 12-6) produces an output EE (item 12-61). In this example, EE is the event of estimating a person's location in a room, and updating an advertisement for a person at the location corresponding to the estimated location label. In some embodiments, an ad displaying screen is configured by the application system. In some embodiments, the application system controls the displaying screen to be turned be turn on/off automatically based on whether there is someone present in the room or a geographic area of interest within viewing distance of the displaying screen.

Figure 12F:
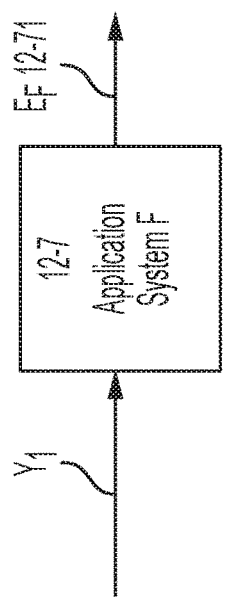
FIG. 12F illustrates the classification system of FIG. 1A and a sixth example embodiment of the application system of FIG. 1A, according to embodiments.

FIG. 12F illustrates an exemplary embodiment in which application system F (item 12-7) produces an output EF (item 12-71). In this example, EF is the event of estimating a person's location in an environment, for example a shop, and performing a financial transaction for the person at the location corresponding to the estimated location label.

Figure 13:
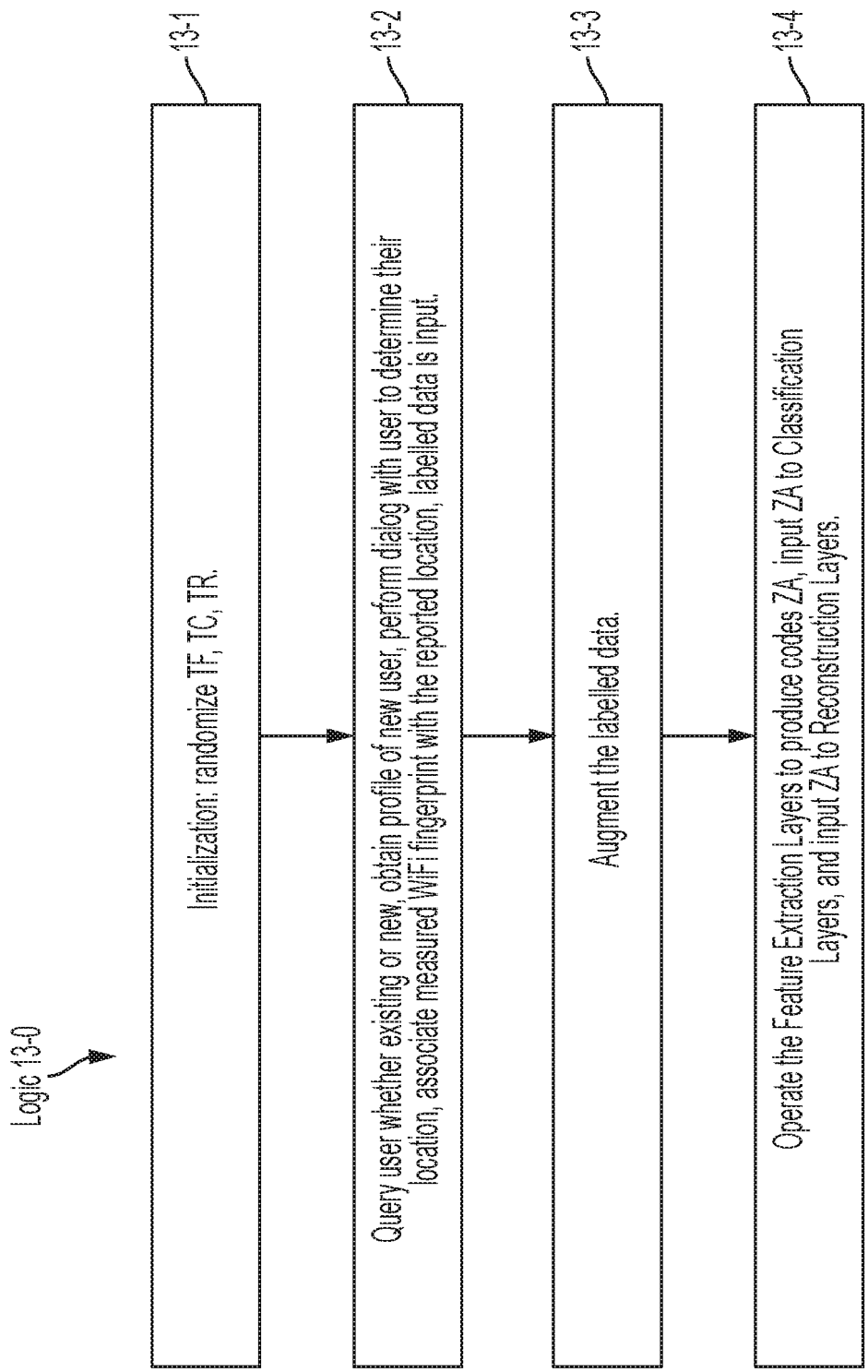
FIG. 13 illustrates an exemplary logic flow of initializing the classification system of FIG. 1A, querying a user, and operating layers using a set of feature data derived based on an augmented fingerprint, according to embodiments.

FIG. 13 illustrates exemplary logic 13-0 involving querying a user. At 13-1, the layers TF, TC and TR are initialized, for example, by randomization.

At 13-2, a user is queried as to whether they are existing or new, a profile is obtained for a new user and a dialog is performed with the user to determine their location, and associate measured fingerprint with the reported location, and labelled data is input. At 13-3, the labelled data is augmented to produce an augmented fingerprint.

At 13-4, TF is operated to produce ZA. ZA is input to TR and TC. Subsequent events may take place as in the logic flows of FIG. 2, 3 or 4.

Figure 14:
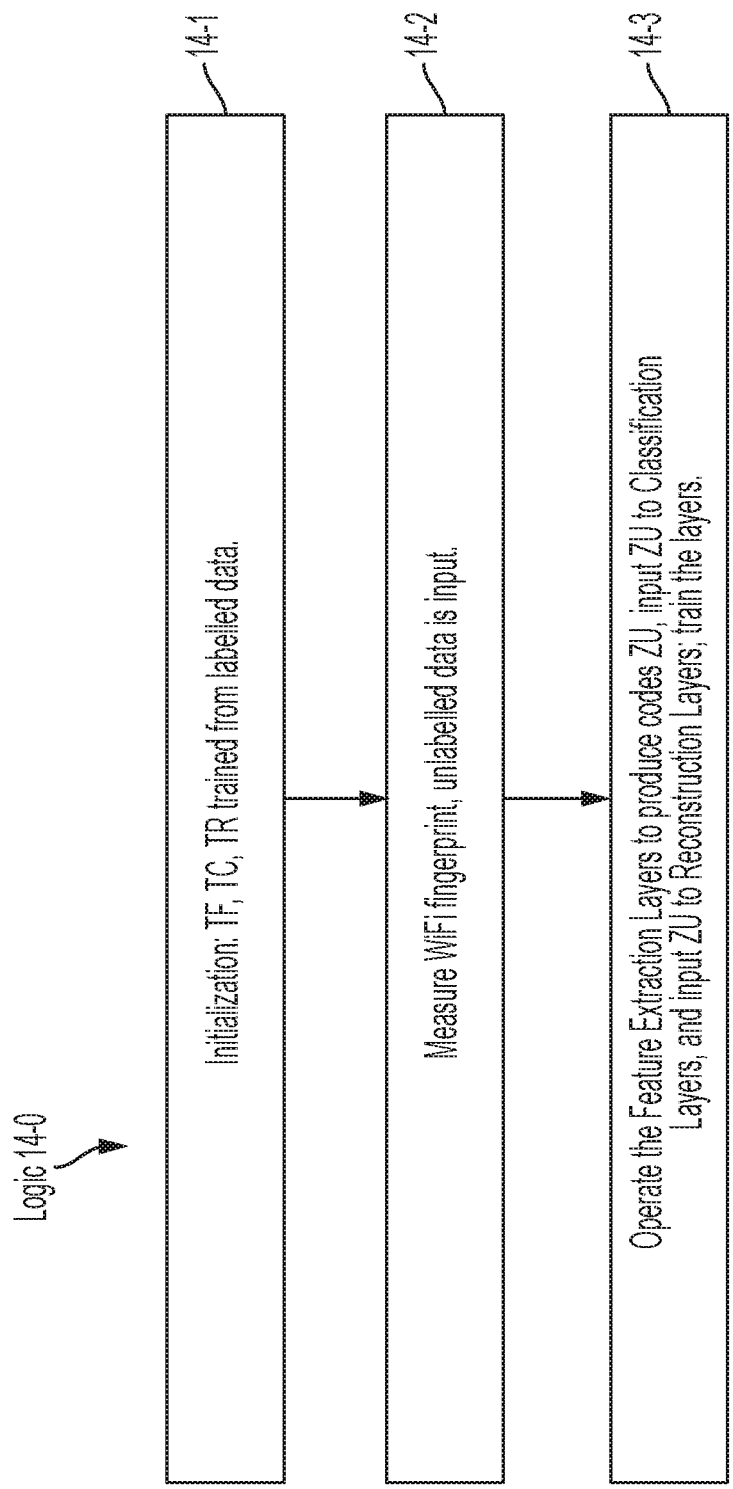
FIG. 14 illustrates an exemplary logic flow of initializing the classification system of FIG. 1A and operating and training layers using a set of feature data derived based on an unlabelled fingerprint, according to embodiments.

FIG. 14 illustrates exemplary logic 14-0 involving an unknown user. At 14-1, the layers TF, TC and TR have already been trained, for example, based on labelled data. At 14-2, a fingerprint is obtained without a label.

At 14-3, the unlabelled data is processed by TF to produce ZU. ZU is input to TR and possibly TC. Subsequent events may take place as in the logic flows of FIG. 2, 3 or 4. Particularly note the threshold event at 2-3 in FIG. 2.

Figure 15:
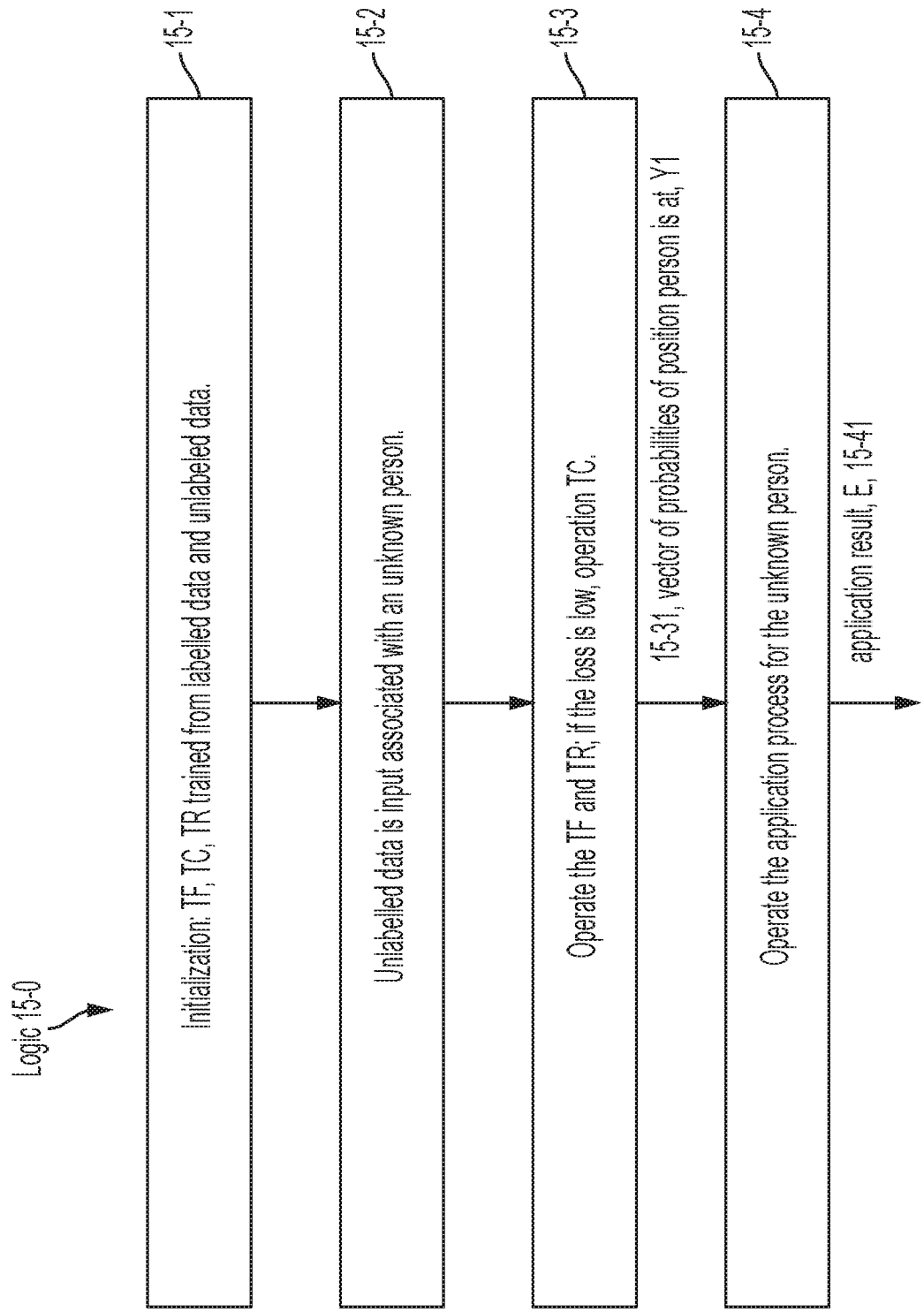
FIG. 15 illustrates an exemplary logic flow of initializing the classification system of FIG. 1A and operating and training layers using a set of feature data derived based on an unlabelled fingerprint; an application result is also obtained, according to embodiments.

FIG. 15 illustrates exemplary logic 15-0 involving an unknown user. At 15-1, the layers TF, TC and TR have already been trained, for example, based on labelled data and unlabelled data. At 15-2, a fingerprint is obtained without a label.

At 15-3, the unlabelled data is processed by TF to produce ZU. ZU is input to TR. Subsequent events may take place as in FIG. 2 (the threshold event at 2-3 in FIG. 2). An estimated location label 2-51 is obtained based on Y1 15-31 (similar to estimated location label 2-51 of FIG. 2). At 15-4, the application process is run producing the application result E item 15-41. See, for example, exemplary applications in FIGS. 12A, 12B, etc.

Figure 16:
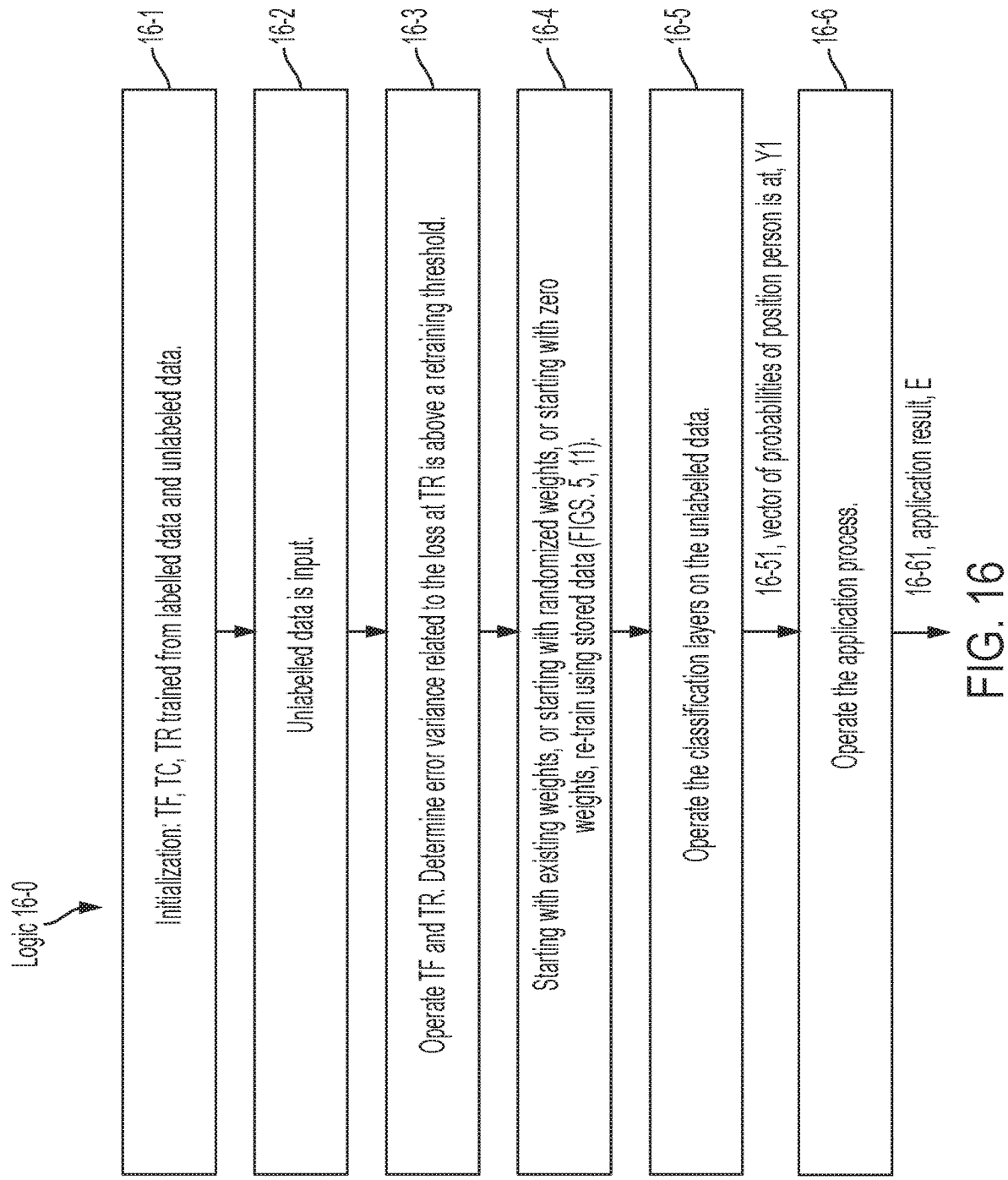
FIG. 16 illustrates an exemplary logic flow of initializing the classification system of FIG. 1A and operating and re-training layers using a set of feature data derived based on an unlabelled fingerprint; an application result is also obtained, according to embodiments.

Logic 16-0 of FIG. 16 illustrates an example of a re-training event. At 16-1, the classification system 1 has already been trained. At 16-2, unlabelled data is input. At

16-3, TF and TR are operated. A loss measurement at TR is high, above a re-training threshold.

At 16-4, starting in one of several weight initial conditions, retrain the weights. The weight initial conditions are: i) existing weights, ii) randomized weights, iii) zero weights. In some embodiments, randomized weights for initialization is a preferred embodiment.

In some embodiments, classification then proceeds. For example, at 16-5, TC is operated with the re-trained weights and Y1 (item 16-51) is obtained (or a location label). At 16-6, the application process then operates and produces an application result, E (item 16-61).

Figure 17:
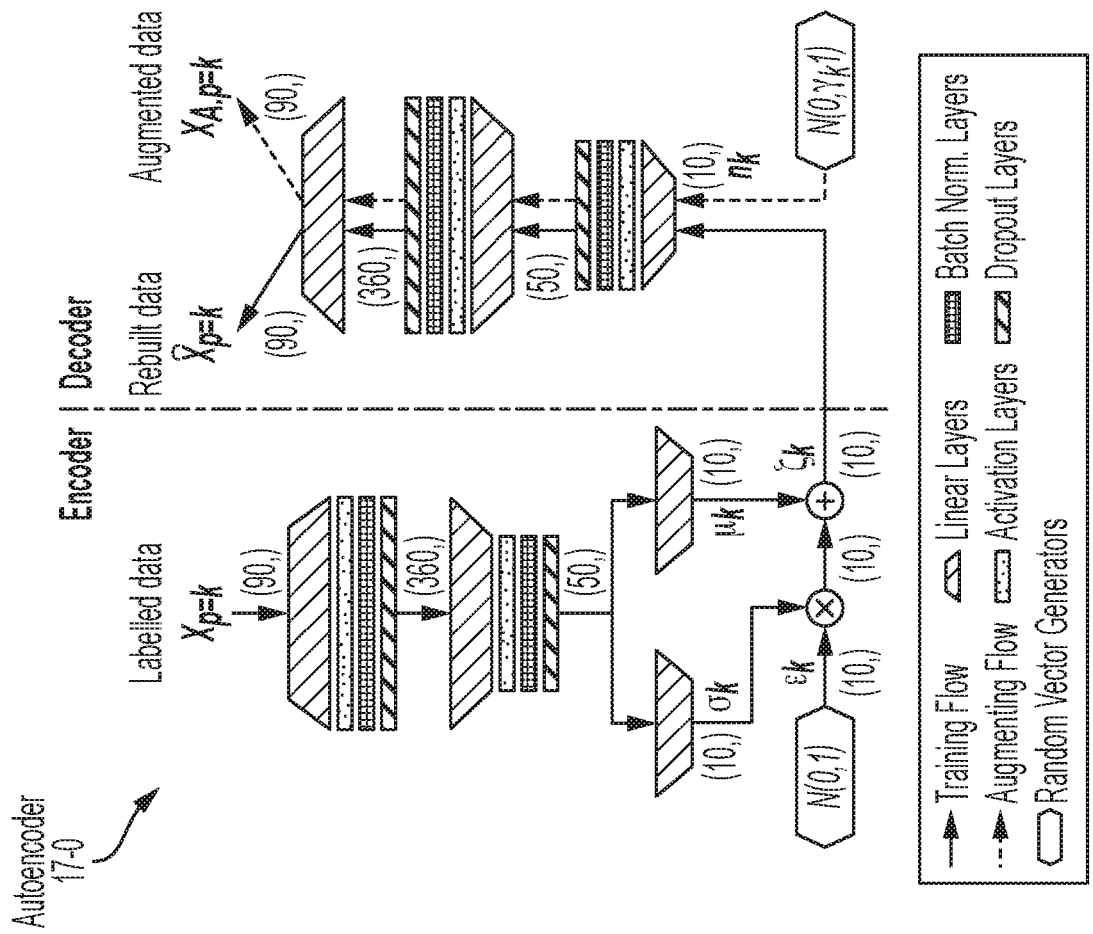
FIG. 17 is a block diagram of an exemplary autoencoder, according to embodiments.

FIG. 17 provides an exemplary structure of an auto encoder (item 17-0) for performing data augmentation such as FIGS. 7B, 7C, 9B and 9C.

Data augmentation aims to enhance the diversity and sample size of the training data to improve the final performance of learned models. It is commonly used for image classification tasks and has also shown its effectiveness for several other applications including machine fault detection and recommendation.

There are several methods to implement data augmentation. General data augmentation methods include translation, rotation, shearing, and flipping of the original data. Generative models can be a kind of data augmentation method. Data augmentation with GANs may be used on few-shot learning settings.

In some embodiments, the training data set is enlarged with data generated by VAE models.

Figure 18:
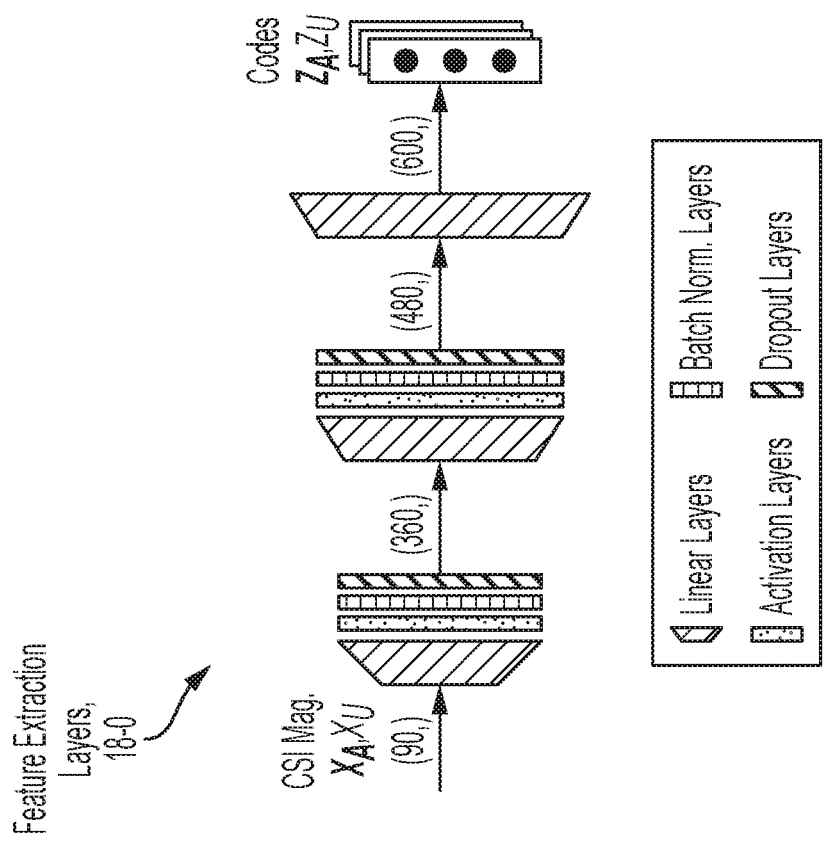
FIG. 18 is a block diagram of exemplary feature extraction layers, according to embodiments.

FIG. 18 provides an exemplary structure of feature extraction layers, TF (item 18-0), for extracting features such as shown in FIGS. 8 and 10. Further discussion of the feature extraction layers is given below.

Figure 19:
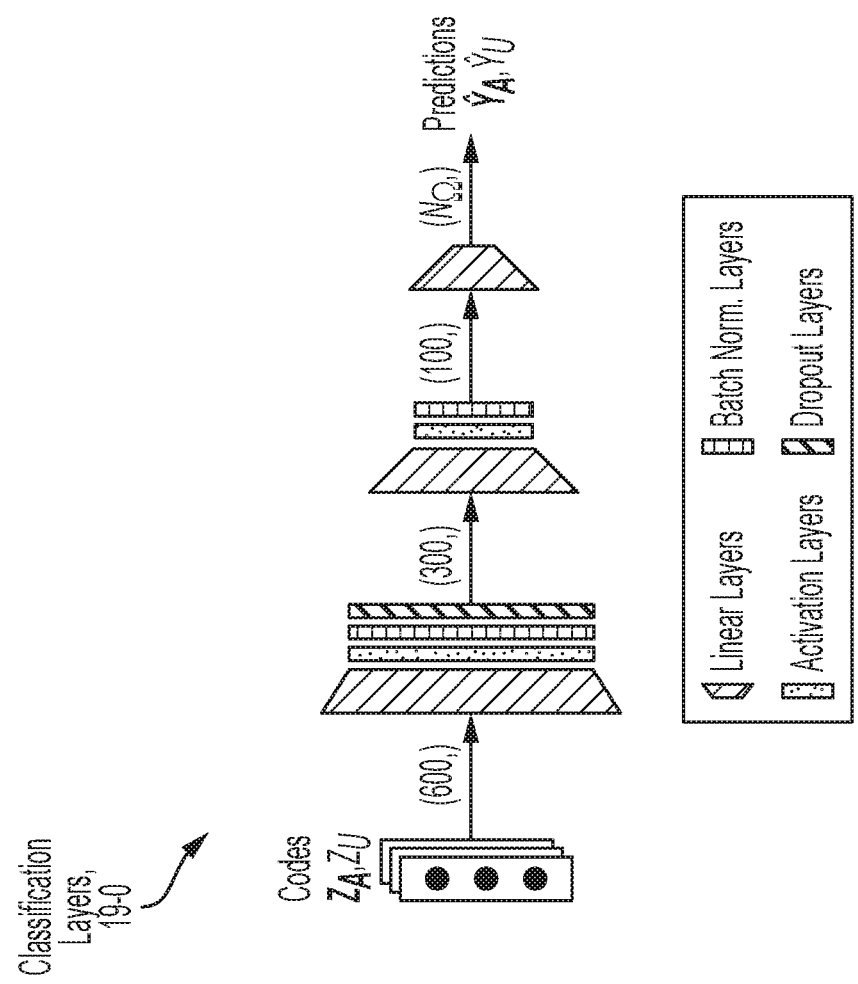
FIG. 19 is a block diagram of exemplary classification layers, according to embodiments.

FIG. 19 provides an exemplary structure of classification layers, TC (item 19-0), for producing probabilities Y1. Further discussion of the classification layers is given below.

Figure 20:
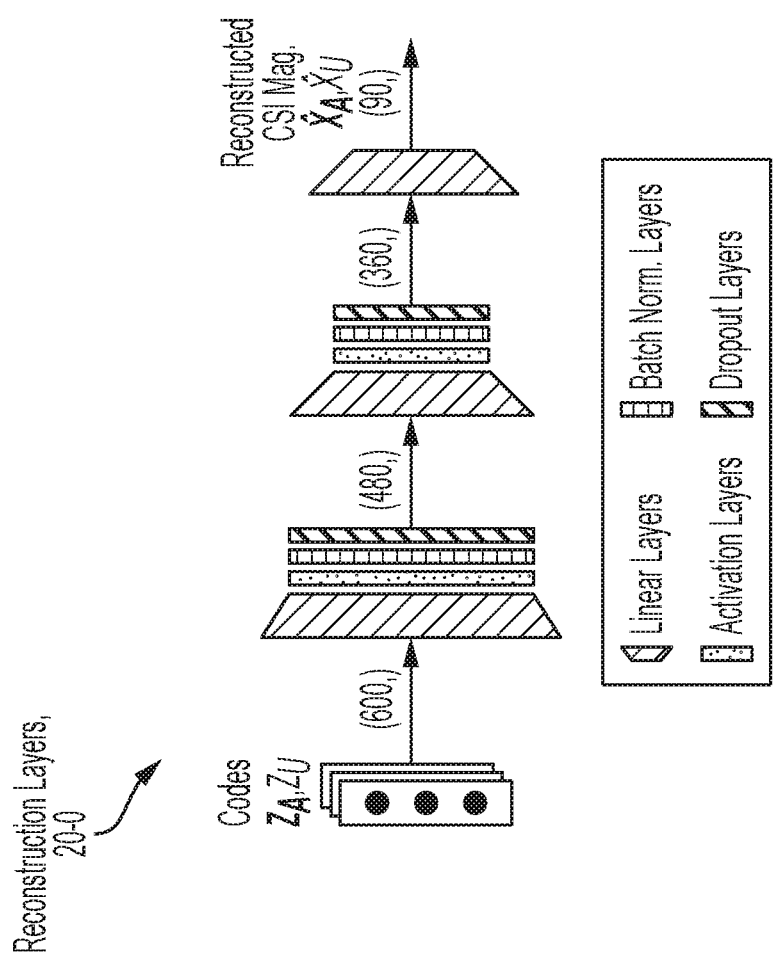
FIG. 20 is a block diagram of exemplary reconstruction layers, according to embodiments.

FIG. 20 provides an exemplary structure of reconstruction layers, TR (item 20-0), for reconstructed fingerprints. Further discussion of the reconstruction layers is given below.

Figure 21:
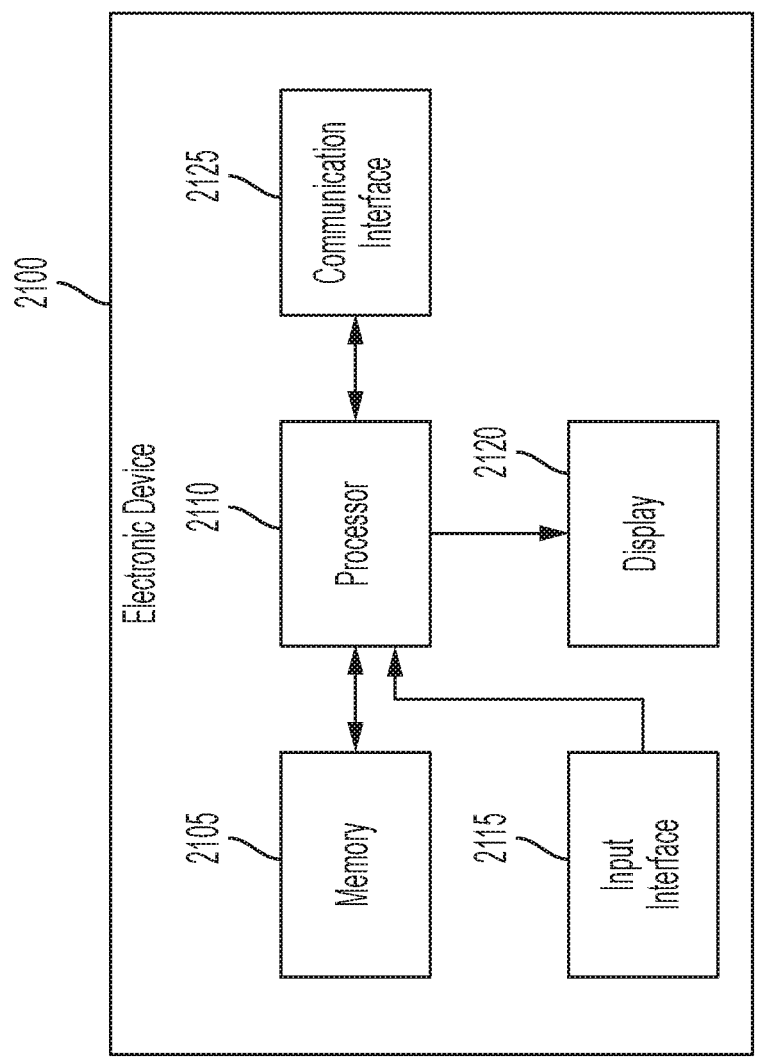
FIG. 21 is a block diagram of an electronic device implementing an apparatus for location-aware applications, according to embodiments.

FIG. 21 is a block diagram of an electronic device 2100 implementing an electronic device for location-aware applications, according to embodiments.

Referring to FIG. 21, the electronic device 2100 includes a memory 2105, a processor 2110, an input interface 2115, a display 2120 and a communication interface 2125. The classification system 1 and/or application system of FIG. 1 may be implemented as the electronic device 2100.

The processor 2110 takes overall control of the electronic device 2100. The processor 2110 executes one or more programs stored in the memory 2105.

The memory 2105 stores various data, programs, or applications for driving and controlling the electronic device 2100. A program stored in the memory 2105 includes one or more instructions. A program (one or more instructions) or an application stored in the memory 2105 may be executed by the processor 2110.

The processor 2110 may perform any one or any combination of operations of the electronic device of FIG. 1.

The input interface 2115 may receive a user input and/or a data such as a 2D image. The input interface 2115 may include, for example, a touchscreen, a camera, a microphone, a keyboard, a mouse or any combination thereof.

The display 2120 may obtain data from, e.g., the processor 2110, and may display the obtained data. The display 2120 may include, for example, a touchscreen, a television, a computer monitor and the like.

The communication interface 2125 transmits and receives data to and from other electronic devices, and may include one or more components causing communication to be performed via a local area network (LAN), a wide area network (WAN), a value added network (VAN), a mobile radio communication network, a satellite communication network, or a combination thereof.

The block diagram of the electronic device 2100 is provided as an example. Each component in the block diagram may be integrated, added, or omitted depending upon specifications of the electronic device 2100 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

Additional description is now provided to the further explain the location-aware embodiments described in FIGS. 1-23.

Suppose one WiFi device is sending signals using its NT X transmission antennas. Another WiFi device is receiving these signals using its NRX receiving antennas. In this sense, there are in total NSS=NT X NRX spatial streams. Suppose each WiFi frequency channel is divided into NSC frequency subcarriers via OFDM. Let $hi,j[t]$ denote the complex WiFi CSI value of the ith stream on the jth subcarrier collected at time t. Let $hi[t]$ denote the complex vector of CSI on the ith stream collected at time t, i.e., $$hi[t]=(hi,1[t],hi,2[t],\ldots,hi,\text{NSC}[t]). \qquad (2)$$

Let $H[t]$ denote the complex vector of CSI on all the subcarriers and streams collected at time t as $$H[t]=(h1[t],h2[t],\ldots,h\text{NSS}[t])=(h1,1[t],\ldots,h1,\\ \text{NSC}[t],h2,1[t],\ldots,h2,\text{NSC}[t],\ldots,\\ h\text{NSS},1[t],\ldots,h\text{NSS},\text{NSC}[t]). \qquad (3)$$

In an example, consider the Intel 5300 NIC, and take one transmission antenna and three receiving antennas as an example. In other words, NT X=1, NRX=3, and NSC=30, and thus H[t] has 90 elements in total.

Denote the data inputted to the localization system at time t as x[t]. This paper uses CSI magnitudes of as the data, i.e., $$x[t]=(|h1,1[t]|,\ldots,|h1,\text{NSC}[t]|,|h2,1[t]|,\ldots,|h2,\\ \text{NSC}[t]|,\ldots,|h\text{NSS},1[t]|,\ldots,|h\text{NSS},\text{NSC}[t]|). \qquad (4)$$

Where |x| denotes the magnitudes (i.e., absolute values) of complex numbers. Ω, "Omega" of FIG. 1B, represents the finite set of locations supported by the proposed framework. y[t] is an element of Ω to label a user's ground-truth location at time t. In addition, yt is using one-hot encoding to achieve a one-hot label vector y[t], of which the dimension is the number of supported locations NΩ. Y=y[t] to denote all the ground-truth location labels.

If an input data point (i.e., a CSI magnitude vector such as f1 or f2 of FIG. 5) is associated with a location label, then it is called a labelled data point, denoted as xL[t] (for example f1). Otherwise, it is called an unlabelled data point, denoted as xU[t] (for example f2). Let XL=xL[t] denote all the labelled data points already collected, and let XU=xU[t] denote all the unlabelled data points already collected. A location fingerprint f[t] is then defined a tuple of a labelled data point and its location label, i.e., $$f[t]=(xL[t];y[t]). \qquad (5)$$

Let F={f[t]} denote the set of all collected fingerprints. Embodiments provided herein train a classifier using F and XU, and predict the y[t] accurately given an x[t].

The data augmenter first takes in the collected fingerprints F (i.e., labelled data), and generates synthetic fingerprints. A synthetic fingerprint fS[t] is defined as:

$$fS[t]=(xS[t];yS[t]), \qquad (6)$$

where xS[t] is a synthetic data point from the synthetic data set XS, and yS[t]Ω is a synthetic location labelled associated with xS[t]. Also, let YS=yS[t] denote all synthetic labels, and let FS=fS[t] denote the set of all synthetic fingerprints.

The data augmenter may be considered as a first neural network, for example, a Neural Network 1.

The final output FA of the data augmenter is then a disjoint union of FS and F, i.e., $$FA = F (\text{disjoint union with}) FS. \qquad (7)$$

These augmented fingerprints FA, together with the unlabelled data XU will be used to train the domain-adaptive classifier. To achieve the domain adaptation capability, this classifier uses a Joint Classification-Reconstruction (JCR) structure. As shown in FIG. 3, the classifier consists of two paths: the classification path and the reconstruction path. The classification path contains feature extraction layers followed by the classification layers. This path takes in a data point (either labelled or not), and predicts a location label. The reconstruction path shares the same feature extraction layers with the classification path, and then diverges into separate reconstruction layers. This path takes in a data point (either labelled or not), and reproduces it as similarly as possible.

The domain adaptive classifier may be considered as a second neural network, for example, a Neural Network 2.

A first system may consist only of Neural Network 2.

In some embodiments, a system may include both Neural Network 1 and Neural Network 2.

For the classification path, when an augmented fingerprint fA[t] has been created, the path passes the data part xA[t], an augmented fingerprint, through the feature extraction layers to calculate a feature vector zA[t] (corresponding to ZA of, for example, FIG. 5).

From this feature vector ZA, the classification layers predict a location probability vector yˆA[t], denoted as Y1 in FIGS. 1-21. Let YˆA={yˆA[t]} denote the predicted probability vectors for all augmented data points in XA. The classification loss of the classifier is defined as:

$$LA(YA, Y\hat{A}) = IA(yA[t], y\hat{A}[t]), \qquad (8)$$

where IA[t] is the cross entropy loss of a single data point as:

$$IA(yA[t], y\hat{A}[t]) = -kpk[t]\log \rho\hat{k}[t]. \qquad (9)$$

ρk[t], ρˆk[t] are the kth elements of yA[t], yˆA[t], respectively. For the classification path, when an unlabelled data point xU[t] comes (unlabelled fingerprint), this data point travels through the layers in the same way as a labelled data point xA[t]. A feature vector zU[t] is extracted, and a prediction yˆU[t] is produced. Since there is not a ground-truth label for this unlabelled data point, a classification loss as in Eq. (9) is not calculated. Instead, embodiments calculate a conditional entropy as $$IU(y\hat{U}[t]) = -k\varphi k[t]\log \varphi\hat{k}[t], \qquad (10)$$

where φˆk[t] denotes the kth element of yˆU[t]. And the clustering loss of the domain-adaptive classifier is defined as:

$$LU(Y\hat{U}) = IU(y\hat{U}[t]). \qquad (11)$$

The use of this clustering loss follows the cluster assumption in the area of domain adaptation and semi-supervised/unsupervised learning. This cluster assumption states that decision boundaries should avoid high-density regions. By minimizing the clustering loss in Eq. (11), the classifier is more confident on the unlabelled data, and thus drives the decision boundaries away from them.

For the reconstruction path, both XA and XU will flow through it in the same procedure. Next embodiments take an unlabelled data point xU[t] as an example. If an unlabelled data point xU[t] comes, the reconstruction path first passes xU[t] through the shared feature extraction layers to obtain a feature vector zU[t]. Given this zU[t], the reconstruction layers output a xˇU[t], which tries to reproduce xU[t] as much as possible. Similarly for a labelled data point xA[t], an intermediate feature vector zA[t] and a reproduction xˇA[t] based on this vector are generated. Embodiments use XˇA={xˇA[t]} and XˇU={xˇU[t]} to denote the data reconstructed from the augmented and unlabelled data, respectively. Embodiments then define the reconstruction loss of the domain-adaptive classifier as:

$$LR = td(xA[t], x\check{A}[t]) + td(xU[t], x\check{U}[t]), \qquad (12)$$

where d(,) is a distance metric between two vectors. In this paper, d(,) is implemented as the Euclidean distance.

By sharing the feature extraction layers between both paths, classification layers use features that are representative for both labelled and unlabelled data. In this way, the classifier can adapt itself to unlabelled domains, where the unlabelled data come from. Unlabelled data is used to adapt a classifier to new domains. Therefore, Challenge 2 is solved.

The augmenter (FIG. 17) generates synthetic fingerprints from a limited amount of collected (labelled) fingerprints.

The data augmenter implements NΩ Variational Autoencoders (VAEs). Each VAE, see FIG. 17, is dedicated to one location out of the NΩ supported locations. The kth VAE is trained with fingerprints collected at the kth location, and produces synthetic fingerprints for this location only.

As illustrated in FIG. 17, a VAE has an encoder-decoder structure.

The encoder of a VAE aims to encode the input into a normal distribution N (0, γkI), where γk is a pre-selected hyperparameter and I is an identity matrix. Correspondingly, the decoder tries to reproduce the input from this normal distribution. Later, embodiments feed samples drawn from N (0, γkI) into the decoder, to generate a large amount of synthetic data similar to yet different from the training data.

During the training phase, the data augmenter separates the fingerprints into NΩ subsets according to their location labels. Use Fp=k to denote the fingerprint subset of the kth (k=1, 2, NΩ) location, and denotes the data part of these fingerprints as Xp=k. Xp=k is then fed to the kth VAE for training. The kth VAE takes a batch Xb from Xp=k, and feeds this batch into its encoder. For the sake of clarity, the data flow is described using one single data point xk[t] ∈ Xb as an example.

From the 90-dimensional input xk[t], the encodes extracts a 10-dimensional vector of means μk[t] and a 10-dimensional vector of standard deviations σk[t]. These two vectors define a 10-dimensional normal distribution, from which a latent vector ζk[t] is drawn. To preserve the back propagation machinery, apply reparameterization to generate ζk[t]:

$$\zeta k[t] = \mu k[t] + \epsilon k[t] * \sigma k[t], \qquad (13)$$

where εk[t] is drawn from the normal distribution N (0, I), with I being 10-dimensional. Eq. (13) is implemented by inserting two elementwise arithmetic nodes in the network model. Recall that the task of the encoder is to match the distribution of ζk[t] with the normal distribution N (0, γkl). Hence, the loss between the above distributions is defined as the Kullback-Leibler divergence $$IKLD[t]=D(N(\mu k[t], \sigma k[t]), N(0, \gamma kl)). \quad (14)$$

The output of the encoder (i.e., ζk[t]) is then passed to the decoder, which generates a vector x̂k[t] to rebuild the input xk[t]. The rebuilding loss1 is defined as the Euclidean distance between xk[t] and x̂k[t]:

$$IB[t]=d(xk[t], x\hat{}k[t]). \quad (15)$$

The loss function of the whole VAE model is defined as the sum of the distribution loss and the rebuilding loss [5], i.e., $$IVAE[t]=IKLD[t]+IB[t]. \quad (16)$$

The generation of synthetic data is conducted solely by the decoder. It starts from a sampler, which generates a 10-dimensional sample nk[t] from a normal distribution N (0, γkl) in every iteration. This nk[t] is then passed through the decoding layers, which produces a 90-dimensional vector xS,p=k[t]. Keep producing new synthetic data points, until the size of the synthetic data for the kth location XS,p=k=xS,p=k[t] is 10 times larger than the size of the original labelled data Xp=k.

The 1-on-1 VAE-location mapping allows each VAE to automatically label the synthetic data points using the location dedicated to this VAE. Once the kth VAE produces a synthetic data point xS,p=k, a location vector k (the one-hot encoding of k) is assigned to it to create a synthetic fingerprint as $$fS[t]=(xS,p=k[t]; k). \quad (17)$$

Synthetic data points are collected and labeled based on Eq. (17), to obtain the synthetic fingerprints as FS=fS[t], and then output FA as the disjoint union of FS and F, as in Eq. (7).

The feature extraction layers are the starting point of both the classification path and the reconstruction path. All augmented (labelled) and unlabelled data will pass through these layers to generate their feature vectors. Next augmented data XA are taken as an example to describe how data flows through these layers. The flow of unlabelled data XU is the same in these layers.

FIG. 18 illustrates this data flow, from left to right. An augmented data point xA[t] XA enters the 1st linear layer, which extends this 90-dimensional vector into a 360-dimensional vector. The 2nd linear layer extends the 360-dimensional vector into a 480-dimensional vector. The 3rd linear layer further extends the dimensions from 480 to 600, and outputs the feature vector zA[t]. The above three layers compute linear combinations of CSI magnitudes on different subcarriers and streams to generate meaningful features. In addition, embodiments insert a sigmoid activation layer, a batch normalization layer and a dropout layer (dropout rate 0.3) between the 1st and the 2nd linear layers, as well as between the 2nd and the 3rd linear layers. The sigmoid layers introduce non-linearity; the batch normalization layers speed up the training; and the dropout layers try to avoid overfitting.

After obtaining the feature vectors, the classification path and the reconstruction path diverge from each other.

The classification path flows into the classification layers, after the feature vectors are extracted. Both ZA and ZU go through these classification layers to produce predictions Ŷ A and Ŷ U, respectively. FIG. 18 presents the detailed design of these layers.

The feature vector of a labelled data point is an example. Concretely, a 600-dimensional feature vector zA[t] is shrunk to a 300-dimensional vector and then a 100-dimensional vector, by the 1st and the 2nd linear layers, respectively. This 100-dimensional vector is then passed to the third linear layer to predict a NΩ-dimensional one-hot encoded location probability vector ŷA[t]. A sigmoid activation layer, a batch normalization layer and a dropout layer (dropout rate 0.3) exist between the 1st and the 2nd linear layers. A sigmoid activation layer and a batch normalization layer exist between the 2nd and the 3rd linear layers. Given the vector ŷA[t], embodiments calculate the classification loss IC[t] of one data point according to Eq. (9). Then, the aggregated classification loss LC of all augmented data (or a batch of augmented data) is computed according to Eq. (8). Similarly, these classification layers predict a location probability vector ŷU[t], also referred to as Y1, for a given zU[t]. The conditional entropy is calculated using Eq. (10), and the aggregated clustering loss is calculated of all unlabelled data (or a batch of unlabelled data) using Eq. (11).

After coming out from the feature extraction layers (FIGS. 5, 18), the reconstruction path flows into the reconstruction layers (FIGS. 5, 20), which take both augmented and unlabelled data as inputs. Next is an example data flow of unlabelled data. The flow of the augmented data is identical.

As shown in FIG. 20, a 600-dimensional feature vector zU[t] is shrunk to a 480-dimensional vector and later a 360-dimensional vector by the 1st and the 2nd linear layers, respectively. From this 360-dimensional vector, the 3rd linear layer tries to generate a 90-dimensional vector x̂U[t] that reproduces xU[t] as much as possible. An aggregated reconstruction loss is computed for all data with and/or without labels (or a batch of unlabelled and/or augmented data points) using Eq. (12).

The aforementioned layers form a JCR structure, with the shared feature extraction layers as the joint of the two paths.

A joint training algorithm is illustrated in FIG. 22 ("Algorithm 1").

Under this structure, the extracted features are representative for both labelled and unlabelled data, and assist the classifier to extend its coverage to the unlabelled domains (i.e., unlabelled users in this paper). In this way, even when the newly collected data cannot be labelled, Embodiments provided herein still automatically learns to utilize the features of the new users or the changed environments. In order to train this JCR structure, a joint training algorithm is applied. This joint training algorithm has some efficiency benefits over the alternating training algorithm used by WiDo. For clarity, denote the parameters of the feature extraction layers, the classification layers and the reconstruction layers as ΘF (TF), ΘC (TC) and ΘR (TR), respectively. See FIG. 5.

Given the augmented fingerprints FA (including the data points XA and their labels YA) and the unlabelled data XU, to the newly collected unlabelled data, embodiments first sample a batch of labelled data points Xb (and the corresponding Yb from YA), and a batch of unlabelled data point Xb from XU. Both batches are then removed from their original sets, respectively. Embodiments pass XbA and XbU the feature extraction layers, which extract features ZbA and ZbU. See FIG. 5 and FIG. 18. These features are fed into the classification layers FIG. 19 to produce location predictions Ŷb and Ŷb. In the meantime, these features go through the reconstruction layers FIG. 20 to generate reconstructed data as X^b A and X^bU. With these outputs, embodiments can calculate the losses. Embodiments calculate the classification loss L (Yb, Y^b) using Eq. (8), and compute the clustering loss LU (Y^b) based on Eq. (11). Embodiments also obtain the reconstruction loss LR(Xb, X^b, Xb, X^b) according to Eq. (12). From these embodiments construct an aggregated loss L as $$L=\lambda 1*LA+\lambda 2*LU+\lambda 3*LR, \quad (18)$$

where $\lambda 1$, $\lambda 2$, and $\lambda 3$ are weights to balance the losses. The aggregated loss is then back-propagated to update $\Theta F$ and $\Theta C$ and R. Specifically, $\Theta C$ is updated by $\lambda 1LA+\lambda 2LU$, $\Theta R$ is updated by $\lambda 2LU+\lambda 3LR$, and $\Theta F$ is updated by L.

In an iteration of Algorithm 1, see FIG. 22, $\Theta F$ is trained to capture features that are able to support two different tasks: (1) predicting a location, and (2) representing both labelled and unlabelled data in the same embedding space. Since these two tasks are trained in a joint manner, the classifier is able to predict a location using features that are representative for both labelled and unlabelled data points. In this way, embodiments are able to adapt prediction to the newly collected unlabelled data.

Figure 23:
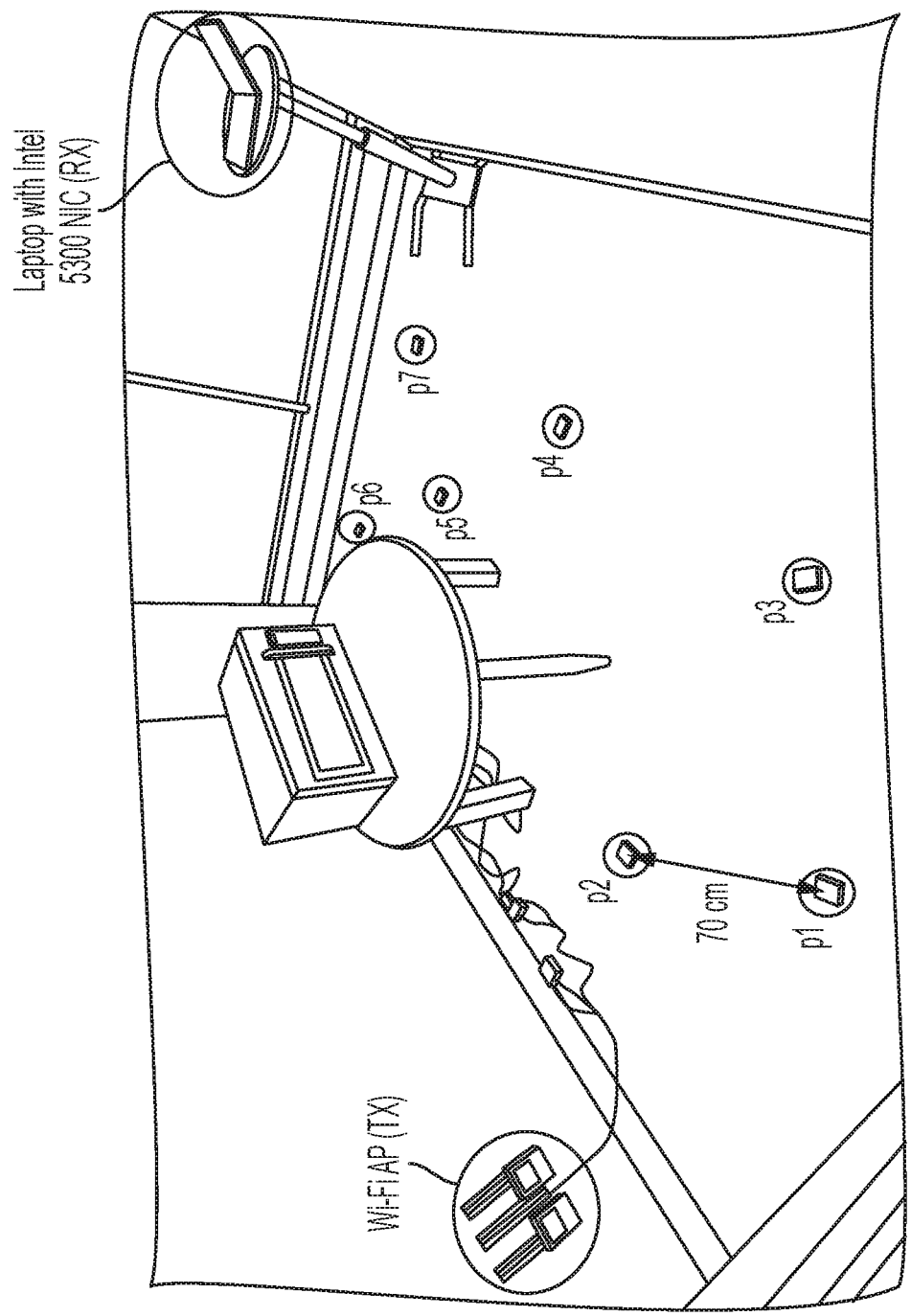
FIG. 23 illustrates an exemplary environment in which embodiments have been evaluated.

Experiment environment and device placements are illustrated in FIG. 23. Experiments were conducted in a 3 m by 4 m office room. All tested localization systems were expected to cover 8 locations (i.e., $N\Omega=8$), which were denoted as p0, p1, . . . , p7, respectively. Among them, p0 is a virtual location corresponding to a status that the room is empty. The rest locations were distributed inside the room with a minimum distance of 70 cm. A Dell Latitude E7440 laptop with Intel 5300 WiFi chip was connected to a TP-Link AC1750 WiFi router to create standard WiFi signals covering the whole room. Embodiments installed the Linux CSI on the laptop to extract CSI readings and fed them to Widora (and other systems), which also reside on the laptop.

To collect CSI readings, embodiments turned on 1 antenna (out of 3) on the WiFi router, and enabled all 3 antennas on the laptop. The Intel 5300 WiFi chip measures CSI on 30 subcarriers. Hence, in the experiments, embodiments had NT X=1, NRX=3, NSS=1×3=3, and NSC=30. The CPU (Intel-i5 1.9 GHz) utilization was less than 15% and 10% for training and testing, respectively. Memory usage was less than 60 MB. To store a trained model, it took around 4.9 MB disk space.

TABLE I

Different Environments

| Index | Glass Door | Rolling Chair | Metal Shutters |
|---|---|---|---|
| Env 1 | Closed | Inside | Closed |
| Env 2 | Opened | Inside | Closed |
| Env 3 | Opened | Outside | Closed |
| Env 4 | Opened | Outside | Opened |

TABLE II

Different Environment Changes

| Index | Action | Source | Target |
|---|---|---|---|
| Change 1 | Opening the glass door | Env 1 | Env 2 |
| Change 2 | Moving a rolling chair into the room | Env 2 | Env 3 |
| Change 3 | Opening the metal shutters | Env 3 | Env 4 |

TABLE III

Data Separation for User Diversity

|  | Labelled data | Unlabelled data |
|---|---|---|
| Training | ~5K from 1D2&ID4 | ~1.08M from ID1-1D9 |
| Testing | ~1.08M from ID1-1D9 | n/a |

TABLE IV

Data Separation for Environment Changes

|  | Labelled data | Unlabelled data |
|---|---|---|
| Training | ~20K from source | ~700K from both |
| Testing | ~720K from both | n/a |

Introducing User Diversity: To record CSI of different users, 9 volunteers with different genders (3 females and 6 males) were recruited, heights (from 155 cm to 186 cm) and weights (from 45 kg to 88 kg).

Introducing Environment Changes: To study the impact of environment changes, embodiments first defined several environments in Table I. Embodiments then deliberately introduced some commonly-seen daily changes to the environments. For instance, Environment 1 was altered into Environment 2 by the action of opening the glass door. Embodiments further considered that, for Change 1, Environment 1 was the source domain and Environment 2 was the target domain. As an example, an environment change is defined as a combination of 1) a daily action, 2) the source domain to which the action is applied, and 3) the resulting target domain. Thereby, embodiments defined Change 1, Change 2 and Change 3 in Table II.

Data Collection: Embodiments include the router periodically sending pings to the laptop, with a speed of 100 packets per second. This corresponds to a 51.2 Kbps traffic, consuming only a tiny fraction of WiFi capacity. The concepts of iterations and runs of data collection are now described.

One iteration of data collection: While one volunteer stands at one location for 60 seconds, the corresponding WiFi CSI readings are recorded and labelled with this location. This is one iteration of data collection. During an iteration, a volunteer is allowed to move freely and naturally (e.g., turning around, stretching, doing arms akimbo, etc.), as long as a he/she remains on the location.

One run of data collection: A volunteer conducts 5 iterations at the first location, moves to the second location, finishes another 5 iterations, and keeps repeating so, until all the locations are covered.

One run of data collection contains $5\times N\Omega=40$ iterations, which gave 100*60*40=240K CSI readings.

To collect data on user diversity, the environment is kept unchanged (i.e., Environment 1) and every volunteer is asked to conduct one run of data collection. Thereby, data is collected in total 9 runs, which gave us 9*240K=2.16M data points to evaluate user diversity.

To collect data on environment changes, the volunteers ID1, ID2, and ID3, were asked to repeat 4 different runs under 4 different environment settings (as listed in Table I]), respectively. Thereby, data points are collected in total amounting to 3*4*240K=2.28M data points to evaluate environment changes.

Data Separation for User Diversity: To emulate real-world challenges faced by localization systems (i.e., Challenge 1 and Challenge 2), embodiments separate the data as follows.

First, it may be feasible to label only a few users in the real scenarios. To emulate this, the labelled data used for training only comes from two volunteers, who are called example users. Secondly, even for these two example users, they may be able to provide a limited number of labelled data points. To reproduce this, there are only 5K labelled CSI readings from them together. In addition, to emulate the potentially huge number of unlabelled data for training, separate the rest of the data into 50% unlabelled training data (by not using their class labels nor domain labels in training) and 50% testing data. By choosing different example users, scenarios will have different data separation results. The specific data separation used herein is summarized in Table III.

TABLE V

SYSTEM EVALUATED. HERE 0 MEANS THAT A SYSTEM EMBRACED A CERTAIN MODULE, WHILE x INDICATES THAT THE MODULE WAS MISSING.

| System | Data Augmentation | JCR Structure | Clustering Loss | Fingerprint Update |
|---|---|---|---|---|
| Widora | 0 | 0 | 0 | x |
| WiDo | 0 | 0 | x | x |
| VAE-only | 0 | x | x | x |
| AutoFi | x | x | x | 0 |

TABLE VI

AVERAGE RECALL, PRECISION AND WEIGHTED F1 SCORES OF DIFFERENT SYSTEMS ACROSS ALL LOCATIONS AND IDs

| | Recall | Precision | F1 score |
|---|---|---|---|
| AutoFi | 72.9% | 75.8% | 72.7% |
| VAE-only | 81.0% | 81.1% | 80.7% |
| WiDo | 84.6% | 85.0% | 84.5% |
| Widora | 90.6% | 90.7% | 90.5% |

Widora and WiDo have been disclosed herein.

WiDo, as opposed to Widora, does not apply the cluster assumption used in Widora, and thus resulted in a relatively high class ambiguity in the target domain.

VAE-only only implemented the data augmenter of Widora, and connected the augmenter only to the classification path. The reconstruction path and the clustering loss were discarded. VAE-only was used to conduct ablation study of Widora's modules.

AutoFi served as a representative of existing fingerprint-updating methods (e.g., MSDFL, which utilized a fully connected NN instead of the autoencoder in AutoFi.). AutoFi required neither class labels nor domain labels as inputs. Instead, it periodically detected whether the room is empty or not, and used this empty-room status as an indicator of domain changes. All new data collected after a detection of an empty-room status were automatically tagged with a new domain label. A polynomial mapping function and an autoencoder were then applied to update the CSI fingerprint database.

Table V summarizes their differences.

The two smallest volunteers (i.e., ID2 and ID4) were example users (of whom 5K data points were used as labelled training data) in an evaluation. The data is separated as shown in Table III. Widora and DAV-only were able to leverage both the 5K labelled training data and the 1.08M unlabelled training data. Note that AutoFi and VAE-only could only use the 5K labelled data as training data (VAE-only augmented the training data to get 10 times more data points).

Table VI lists the average recall, precision, and weighted F1 score (i.e., the harmonic mean of precision and recall, weighted by the number of true labels of each class) across all locations and IDs. It is shown that AutoFi had the worst performance, due to its incapability to handle the diversity of users. AutoFi yielded recall and precision as low as 72.9% and 75.8%, respectively. By augmenting the limited labelled data, VAE-only was able to cover more potential users, and thus increased recall and precision to 81.0% and 81.1%, respectively. WiDo embraced both the augmentation of labelled data and the domain adaptation with unlabelled data, and consequently improved recall and precision to 84.6% and 85.0%, respectively. By introducing a clustering loss, Widora further enhanced WiDo, and achieved the best performance among all. Compared to the baseline AutoFi, Widora improved recall, precision and F1 scores (in absolute numbers) by 17.7%, 14.9% and 17.8%, respectively. Moreover, compared to WiDo, Widora also increased these metrics by 6.0%, 5.7% and 6.0%, respectively.

To better compare the localization systems, the location confusion matrices of different systems are considered (not shown). AutoFi's True Positive Rates (TPR) across different locations were quite diverged, ranging from 52.3% at location p3 to 95.6% at location p2. Such a large gap between the best and the worst (i.e., 43.3%) was an indicator that AutoFi was overfitted by the data from example users. The data augmenter helped VAE-only increase the worst-case TPR to 62.2% at p1, while keeping the best TPR as 95.6% at p2. However, the 33.4% best-worst TPR gap suggested that VAE-only might be also overfitted. On the contrary, the domain-adaptive classifier design assisted WiDo and Widora to tackle the overfitting, and improved the worst-case TPR to 80.4%, while maintaining the best-case TPR as high as 93.3%. With the help of the clustering loss, Widora further enhanced the best-case TPR to 99.0%, while keeping the same worst-case TPR as WiDo. This means that Widora not only provided the maximum worst-case performance, but also functioned consistently well across different locations.

TABLE VII

AVERAGE F1 SCORES OVER ALL LOCATIONS IN THE PRESENCE OF DIFFERENT ENVIRONMENT CHANGES

| | Target-Domain F1 score | | | Source-domain F1 score | | |
|---|---|---|---|---|---|---|
| | Change 1 | Change 2 | Change 3 | Change 1 | Change 2 | Change 3 |
| AutoFi | 63.9% | 57.1% | 67.8% | 92.8% | 93.5% | 95.5% |
| VAE-only | 77.2%(+13.3%) | 64.9%(+7.8%) | 70.7%(+2.9%) | 97.4% | 97.0% | 94.9% |
| WiDo | 79.3%(+15.4%) | 72.8%(+15.7%) | 71.7%(+3.9%) | 93.3% | 96.2% | 95.3% |
| Widora | 87.0%(+23.1%) | 77.2%(+20.1%) | 87.3%(+19.5%) | 94.7% | 96.5% | 95.6% |

Robustness to Users' Heights: Embodiments use the average height of example users (i.e., ID2 and ID4) as the example height, and divide all users into three groups based on their absolute differences to this example height. It was confirmed that the localization accuracy decreased with the increase in the height difference between the testing user and the example users. AutoFi decreased most drastically, suggesting that it was not able to handle the variation in users' heights. When applied to the example users, AutoFi's accuracy is as high as 96.2%. However, this number dropped below 69.1%, if a testing user was around 10 cm taller than the example users. This is the evidence that AutoFi was overfitted by the data of example users. Widora, WiDo and VAE-only were able to learn localization features that are less correlated with users' heights, and thus achieved better and more robust performance than the baseline. In particular, Widora maintained its accuracy above 87.1% even the height difference is bigger than 20 cm.

While Widora outperformed WiDo on unlabelled users by up to 5.8%, WiDo achieved 1.7% higher accuracy than Widora on example users. This suggested that WiDo was still, to some extent, overfitted to the example users. By utilizing the clustering loss, Widora refined the decision boundaries, and, as an unintended benefit, further corrected the overfitting.

Robustness to Users' Weights: Embodiments took the average weight of example users as the example weight, and divided all users into three groups according to their absolute differences to this example weight. The four groups were <5 kg, 5 kg 20 kg, >20 kg, respectively. In general, localization accuracy decreased, when the absolute weight difference between example users and testing users increased. AutoFi was overfitted to the example users. Its accuracy dropped as low as 66.2%, if testing users were 20 kg heavier than the example users. On the contrary, Widora had the most robust performance in the presence of diverse user weights. Widora was able to maintain its accuracy above 87.9%, even when it was trained on the lightest users and tested on the heaviest users. Compared with AutoFi and WiDo, the improvement were 21.7% and 6.4%, respectively.

Accuracy Under Different Environments

The systems' performance in the presence of several daily environment changes was evaluated, see Table II. For each environment change, data separation was conducted as illustrated in Table IV. Take Change 1 as an example. Experiments took 20K data from Environment 1 as the labelled training data, and considered the rest training data of this environment as unlabelled training data. In addition, experiments treated all the training data from Environment 2 as unlabelled training data. Experiments further mixed the unlabelled data from both environments into one unlabelled training set, where both domain labels and location labels were discarded. Training and testing were then conducted based on such data separations.

Experiments took F1 score as the metric of localization accuracy, and presented the F1 scores of different systems in the presence of different environment changes in Table VII. The results confirmed that Widora achieved the highest accuracy in the presence of different environment changes. Specifically, Widora outperformed the baseline AutoFi by up to 23.1%. Also, compared to WiDo, the proposed Widora improved the accuracy by 7.7%, 4.4% and 15.6% for the three environment changes, respectively. This illustrated that the usage of the clustering assumption/loss indeed helped Widora better address the finger-print inconsistency brought by environment changes. Another interesting insight could be found by comparing WiDo with VAE-only. While WiDo achieved higher F1 scores in the target domains, VAE-only outperformed WiDo in the source domains. This indicated that 1) VAE-only was, to some extent, overfitted to the augmented data; and 2) the JCR structure of WiDo (and Widora) was able to correct this overfitting by learning more generic features from both labelled and unlabelled data. Last but not least, VAE-only outperformed AutoFi in both target and source domains. This suggested that the data augmentation not only provided more data points to enhance source-domain performance, but also extended the coverage of the labelled data to improve target-domain accuracy.

As disclosed herein the inconsistency issue of device-free WiFi fingerprints across different users and/or different environments has been addressed. To address this issue, Widora is described—a WiFi based domain-adaptive localization system, which leverages a data augmenter based on VAEs and a domain-adaptive classifier with a joint classification-reconstruction structure. Unlike existing domain adversarial solutions, Widora does not require implicit labels to distinguish target domain data from source domain data, making it more practical. Compared to WiDo, also disclosed herein, Widora further employs a cluster assumption, and thus reduces the class ambiguity in the new/unseen domains. Moreover, a joint training algorithm is disclosed to achieve a subtle balance between classifying the labelled data and extracting domain-independent features from unlabelled data. Experiments showed that Widora not only provided sub-meter level localization resolution with largely improved accuracy (+20.2% on the worst-case accuracy), but also provided the most robust performance in the presence of diverse unlabelled users and daily environment changes.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN or CNN described above may be implemented via a software module. When the DNN or CNN model is implemented via a software module (for example, a program module including instructions), the DNN or CNN model may be stored in a computer-readable recording medium.

Also, the DNN or CNN model may be a part of the apparatus 100 described above by being integrated in a form of a hardware chip. For example, the DNN or CNN model may be manufactured in a form of a dedicated hardware chip for AI, or may be manufactured as a part of an existing general-purpose processor (for example, CPU or application processor) or a graphic-dedicated processor (for example GPU).

Also, the DNN or CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A method of location determination by a system including an electronic device with a WiFi transceiver and a neural network based AI model, the method comprising:
    receiving, via the WiFi transceiver, a first fingerprint associated with a first person and a first environment, wherein the first person is not a registered user of the system;
    obtaining, using a shared feature extraction layer of the neural network based AI model and based on operating on the first fingerprint, a first set of feature data;
    determining, using a reconstruction layer of the neural network based AI model and based on the first set of feature data from the shared feature extraction layer, a reconstruction loss associated with the first person and the first fingerprint;
    when the reconstruction loss is at or below a threshold:
        classifying, using a classification layer of the neural network based AI model and based on the first set of feature data from the shared feature extraction layer, the first fingerprint to obtain a first estimated location label of the first person, and
        outputting, by visible or audible means, an indicator of the first estimated location label of the first person;
    when the reconstruction loss is above the threshold, performing a registration of the first person.

2. The method of claim 1, wherein the registration includes:
    obtaining, via a user interface of the system, an identifier of the first person,
    obtaining, via the user interface, a ground truth location label of the first person, and
    obtaining, via the WiFi transceiver, a second fingerprint associated with the ground truth location label; and
    providing an application output based on the first estimated location label or the ground truth location label.

3. The method of claim 1, further comprising training weights of the system, based on a third fingerprint associated with the first environment and with a second person who is a first registered user of the system, to obtain updated weights.

4. The method of claim 3, wherein the training weights comprises:
    receiving, by the system, the third fingerprint associated with the first environment and with the second person;
    augmenting the third fingerprint to form a first augmented fingerprint; and
    updating weights of the system based on the first augmented fingerprint.

5. The method of claim 3, wherein the determining a reconstruction loss comprises:
    receiving, via the WiFi transceiver, the first fingerprint;
    determining, based on the updated weights using the shared feature extraction layer, the first set of feature data;
    determining, based on the first set of feature data, a first reconstructed fingerprint of the first person; and
    determining, based on the first fingerprint and the first reconstructed fingerprint, the reconstruction loss of the first reconstructed fingerprint.

6. The method of claim 1, wherein the application output includes the electronic device automatically shutting off based on recognizing that a room is empty.

7. The method of claim 1, wherein the application output includes beam-forming, by the electronic device, sound to the first estimated location label of the first person.

8. The method of claim 1, wherein the application output includes pan-tilting, by the electronic device, a display screen of the electronic device depending on the first estimated location label of the first person.

9. The method of claim 1, wherein the application output includes updating an augmented reality presentation to the first person based on the first estimated location label of the first person.

10. The method of claim 1, wherein the application output includes providing an advertisement to a personal electronic device of the first person based on the first estimated location label of the first person.

11. An electronic device comprising:
    one or more memories, wherein the one or more memories include instructions;
    a WiFi transceiver; and
    one or more processors, wherein the one or more processors are configured to execute the instructions to:
    receive, via the WiFi transceiver, a first fingerprint associated with a first person and a first environment, wherein the first person is not a registered user of the electronic device,
    obtain, using shared feature extraction layers operating on the first fingerprint, a first set of feature data, wherein a neural network based AI model includes the shared feature extraction layer,
    determine, using reconstruction layers and based on the first set of feature data from the shared feature extraction layer, a reconstruction loss associated with the first person and the first fingerprint, wherein the neural network based AI model includes the reconstruction layer,
    when the reconstruction loss is at or below a threshold:
        classify, using classification layers and based on the first set of feature data from the shared feature extraction layer, the first fingerprint to obtain a first estimated location label of the first person, wherein the neural network based AI model includes the classification layers, and
        output, by visible or audible means, an indicator of the first estimated location label of the first person,
    when the reconstruction loss is above the threshold, perform a registration of the first person, wherein the one or more processors are configured to perform the registration by:
        obtaining, via a user interface of the electronic device, an identifier of the first person,
        obtaining, via the user interface, a ground truth location label of the first person, and obtaining a second fingerprint associated with the ground truth location label; and provide an application output based on the first estimated location label or the ground truth location label.

12. A non-transitory computer-readable storage medium storing instructions configured to cause a processor to:

receive, via a WiFi transceiver, a first fingerprint associated with a first person and a first environment, wherein the first person is not a registered user of the electronic device;

obtain, using shared feature extraction layers operating on the first fingerprint, a first set of feature data, wherein a neural network based AI model includes the shared feature extraction layers;

determine, using reconstruction layers and based on the first set of feature data from the shared feature extraction layers, a reconstruction loss associated with the first person and the first fingerprint, wherein the neural network based AI model includes the reconstruction layers;

when the reconstruction loss is at or below a threshold:
classify, using classification layers and based on the first set of feature data from the shared feature extraction layers, the first fingerprint to obtain a first estimated location label of the first person, wherein the neural network based AI model includes the classification layers, and
output, by visible or audible means, an indicator of the first estimated location label of the first person;

when the reconstruction loss is above the threshold, perform a registration of the first person, wherein the one or more processors are configured to perform the registration by:

obtaining, via a user interface of the electronic device, an identifier of the first person, obtaining, via the user interface, a ground truth location label of the first person, and obtaining a second fingerprint associated with the ground truth location label; and provide an application output based on the first estimated location label or the ground truth location label.

13. An apparatus comprising:

an input configured to receive a first plurality of fingerprints and a second plurality of fingerprints, wherein the first plurality of fingerprints includes a first fingerprint, and the first fingerprint is associated with a first person at a first location, and wherein the second plurality of fingerprints includes unlabeled data, and the second plurality of fingerprints includes a second fingerprint;

a data augmenter comprising at least one first processor and at least one first memory, the data augmenter coupled to the input, wherein the data augmenter is configured to generate variational data based on the first plurality of fingerprints;

feature extraction layers comprising at least one second processor and at least one second memory, coupled to the data augmenter, wherein the feature extraction layers are configured to provide first codes and second codes, the first codes are associated with the variational data, and the second codes are associated with the second plurality of fingerprints, wherein a neural network based AI model includes the feature extraction layers;

reconstruction layers comprising at least one third processor and at least one third memory, coupled to the feature extraction layers, wherein the reconstruction layers are configured to produce a reconstructed first fingerprint and a reconstructed second fingerprint, wherein the neural network based AI model includes the reconstruction layers;

classification layers, comprising at least one fourth processor and at least one fourth memory, coupled to the feature extraction layers, wherein the classification layers are configured to predict a second location of a second person, wherein a statistical performance measure of a prediction of the second location of the second person is optimized in a location label domain, wherein the neural network based AI model includes the classification layers; and a controller comprising at least one fifth processor and at least one fifth memory, wherein the controller is configured to:

perform a first update of classification weights of the classification layers, feature extraction weights of the feature extraction layers, and reconstruction weights of the reconstruction layers, based on a first difference between the reconstructed first fingerprint and the first fingerprint, and perform a second update of the feature extraction weights and the reconstruction weights, based on a second difference between the reconstructed second fingerprint and the second fingerprint.

14. The apparatus of claim 13, wherein the second update is a joint update.

15. The apparatus of claim 12, wherein the second update is based on a clustering loss measure, wherein the clustering loss measure promotes avoidance of high-density regions when adjusting the classification weights.

16. The apparatus of claim 12, wherein the controller is further configured to perform a third update of classification weights, based on a difference between the reconstructed second fingerprint and the second fingerprint.

* * * * *